US010351430B1

(12) United States Patent
Kessler et al.

(10) Patent No.: US 10,351,430 B1
(45) Date of Patent: Jul. 16, 2019

(54) METHOD, APPARATUS, AND SYSTEM FOR PRODUCING BUCKYPAPER OR SIMILAR SHEET OR LAYER OF ELONGATED NANOSTRUCTURES WITH A DEGREE OF NANOSTRUCTURE ALIGNMENT

(71) Applicant: Iowa State University Research Foundation, Inc., Ames, IA (US)

(72) Inventors: Michael R. Kessler, Pullman, WA (US); Daniel Vennerberg, Neenah, WI (US)

(73) Assignee: Iowa State University Research Foundation, Inc., Ames, IA (US)

( * ) Notice: Subject to any disclaimer, the term of this patent is extended or adjusted under 35 U.S.C. 154(b) by 5 days.

(21) Appl. No.: 15/865,708

(22) Filed: Jan. 9, 2018

Related U.S. Application Data

(62) Division of application No. 14/334,755, filed on Jul. 18, 2014, now Pat. No. 9,926,201.

(51) Int. Cl.
| | |
|---|---|
| *C01B 32/05* | (2017.01) |
| *B29C 67/00* | (2017.01) |
| *B29D 7/01* | (2006.01) |
| *B29C 67/02* | (2017.01) |
| *B82Y 40/00* | (2011.01) |

(52) U.S. Cl.
CPC .......... *C01B 32/05* (2017.08); *B29C 67/0011* (2013.01); *B29C 67/02* (2013.01); *B29D 7/01* (2013.01); *B29C 2791/003* (2013.01); *B82Y 40/00* (2013.01); *C01B 2202/08* (2013.01); *Y10S 260/00* (2013.01)

(58) Field of Classification Search
USPC ......... 209/212, 213; 264/555, 141; 204/557; 423/461
See application file for complete search history.

(56) References Cited

U.S. PATENT DOCUMENTS

| | | | |
|---|---|---|---|
| 7,438,953 B2 | 10/2008 | Kotov et al. | |
| 7,459,121 B2 * | 12/2008 | Liang ................. | B01D 67/0046 210/650 |
| 2002/0185770 A1 | 12/2002 | McKague | |

OTHER PUBLICATIONS

Development of scalable methods for the utilization of multi-walled carbon nanotubes in polymer and metal matrix composites, Danny Vennerberg, Iowa State University, Abstract, Jul. 14, 2014 (Year: 2014).*

(Continued)

*Primary Examiner* — Lynda Salvatore
(74) *Attorney, Agent, or Firm* — McKee, Voorhees & Sense, PLC

(57) ABSTRACT

A method, apparatus, and system for fabricating buckypaper or similar sheets of nanostructures having relatively high aspect ratios. A dispersion of nanostructures such as nanotubes is subjected to fluid dynamics/forces which promote alignment of their axes of elongation while in suspension in the flow. An agglomeration of better aligned nanostructures is isolated from the carrier fluid into a useable form. In the case of nanotubes, one form is buckypaper. One example of alignment forces is Taylor-Couette flow shear forces. One example of isolation is filtering the flowing dispersion to collect better aligned nanostructures across the filter into a sheet or film. The degree of alignment can produce anisotropic material properties that can be beneficially used in application of the sheet or film.

9 Claims, 25 Drawing Sheets

(56) References Cited

OTHER PUBLICATIONS

Andereck, C. David, et al., "Flow regimes in a circular Couette system with independently rotating cylinders", Jounrnal of Fluid Mechanics, vol. 164, pp. 155-183. Dec. 31, 1986.
Cheng, Qunfeng, et al., "Functionalized Carbon-Nanotube Sheet/Bismaleimide Nanocomposites: Mechanical and Electrical Performance Beyond Carbon-Fiber Composites", Small, vol. 6, No. 6, pp. 763-767. Feb. 22, 2010.
Gonnet, Philippe, et al., "Thermal conductivity of magnetically aligned carbon nanotube buckypapers and nanocomposites", Current Applied Physics, vol. 6(1), pp. 119-122. Dec. 31, 2006.
Halelfadl, Salma, et al., "Viscosity of carbon nanotubes water-based nanofluids: Influence of concentration and temperature", International Journal of Thermal Sciences, vol. 71, pp. 111-117. Sep. 30, 2013.
Hussein, Laith, et al., "Fabrication and characterization of buckypaper-based nanostructured electrodes as a novel material for biofuel cell applications", Phys. Chem. Chem. Phys., vol. 13, pp. 5831-5839. Dec. 31, 2011.
Wang, L., et al., "Correlation effects and electronic properties of fullerenes and carbon nanotubes", Journal of Physics and Chemistry of Solids, vol. 54(11), pp. 1493-1496. Nov. 30, 1993.
White, FM Textbook, "Chapter 4 Differential Relations for a Fluid Particle", pp. 215-276. Dec. 31, 1998.
Ashrafi, et al., "Correlation between Young's modulus and impregnation quality of epoxy-impregnated SWCNT buckypaper", Composites: Part A, p. 1184-1191. Dec. 31, 2010.
Cheng, et al., "High Mechanical Performance Composite Conductor: Multi-Walled Carbon Nanotube Sheet/Bismaleimide Nanocomposites", Adv. Funct. Materials, 19, p. 3219-3225. Dec. 31, 2009.
Darby R., "II. Determination of Fluid Viscous (Rheological) Properties", Chemical Engineering Fluid Mechanics: Marcel Dekker, p. 1-2. Dec. 31, 2001.
Ding, et al., "Heat Transfer of aqueous suspensions of carbon nanotubes", International Journal of Heat and Mass Transfer 49, p. 240-250. Dec. 31, 2006.
Fiedler, et al., "Fundamental aspects of nano-reinforced composites", Composites Science and Technology 66, p. 3115-3125. Dec. 31, 2006.
Fischer, et al., "Magnetically aligned single wall carbon nanotube films: Preferred orientation and anisotropic transport properties", Journal of Applied Physics, vol. 93, No. 4, p. 2157-2163. Feb. 15, 2003.
Guo, et al., "Structure and properties of polyacrylonitrile/single wall carbon nanotube composite films", Science Direct Polymer 46, p. 3001-3005. Dec. 31, 2005.
Hone, et al., "Electrical and thermal transport properties of magnetically aligned single wall carbon nanotube films", Applied Physics Letters, vol. 77, No. 5, p. 666-668. Jul. 31, 2000.
Inoue, et al., "Anisotropic carbon nanotube papers fabricated from multiwalled carbon nanotube webs", Science Direct Carbon 49, p. 2437-2443. Feb. 26, 2011.
Jiang K., et al., "Spinning continuous carbon nanotube yams", Nature, vol. 519, p. 801. Oct. 24, 2002.
Li, et al., "Spinning Carbon Nanotube Nanothread under a Scanning Electron Microscope", Materials, 4, p. 1519-1527. Aug. 29, 2011.
Lima, et al., "Biscrolling Nanotube Sheets and Functional Guests into Yams", Science, vol. 331, p. 51-55. Jan. 7, 2011.
Lin, et al., "Magnetization of graphene tubules", Physical Review B, vol. 52, No. 11, p. 8423-8438. Sep. 15, 1995.
Liu, et al., "Carbon nanotube yams with high tensile strength made by a twisting and shrinking method", Nanotechnology 21, p. 1-7. Dec. 31, 2010.
Liu, et al., "Producing superior composites by winding carbon nanotubes onto a mandrel under a poly(vinyl alcohol) spray", Science Direct Carbon 49, p. 4786-4791. Jun. 30, 2011.
Liu, et al., "Scratch-Resistant, Highly Conductive, and High-Strength Carbon Nanotube-Based Composite Yarns", Acsnano, vol. 4, No. 10, p. 5827-5834. Dec. 31, 2010.
Lu, Jian Ping, "Novel Magnetic Properties of Carbon Nanotubes", Physical Review Letters, vol. 74, No. 7, p. 1123-1126. Feb. 13, 1995.
Moniruzzaman, et al., "Polymer Nanocomposites Containing Carbon Nanotubes", Review, Macromolecules 39, p. 5194-5205. Dec. 31, 2006.
Park, et al., "Effects of surfactants and alignment on the physical properties of single-walled carbon nanotube buckypaper", Journal of Applied Physics 106, p. 104310-1-104310-6. Nov. 23, 2009.
Park, et al., "Electromagnetic interference shielding properties of carbon nanotube buckypaper composites", Nanotechnology 20, p. 1-7. Sep. 16, 2009.
Pham, et al., "Mechanical and electrical properties of polycarbonate nanotube buckypaper composite sheets", Nanotechnology 19, p. 1-7. Jul. 4, 2008.
Walters, et al., "In-plane-aligned membranes of carbon nanotubes", Chemical Physics Letters 338, p. 14-20. Apr. 13, 2001.
Wang, et al., "Highly oriented carbon nanotube papers made of aligned carbon nanotubes", Nanotechnology 19, p. 1-7. Jan. 31, 2008.
Wang, et al., "Processing and property investigation of single-walled carbon nanotube (SWNT) buckypaper/epoxy resin matrix nanocomposites", Composites: Part A 35, p. 1225-1232. Dec. 31, 2004.
Yang, et al., "Thermal and electrical transport in multi-walled carbon nanotubes", Physics Letters A 329, p. 207-213. Jul. 14, 2004.
Zhang, et al., "Multifunctional Carbon Nanotube Yarns by Downsizing an Ancient Technology", Science, vol. 306, p. 1358-1361. Nov. 19, 2004.
Zhang, et al., "Strong, Transparent, Multifunctional, Carbon Nanotube Sheets", Science, vol. 309, p. 1215-1219. Aug. 19, 2005.
Zhang, et al., "Ultrastrong, Stiff, and Lightweight Carbon-Nanotube Fibers", Adv. Mater. 19, p. 4198-4201. Dec. 31, 2007.

* cited by examiner

Pulling/pushing VACNT

Rotation at high speeds can cause turbulence

Inner cylinder rotation: Recritical ≈ 200

Outer cylinder rotation: Recritical ≈ 15,000

Rheological behavior of the aqueous MWCNT dispersion used in this study.

Shear thinning behavior of aqueous CNT dispersions as a function of temperature and concentration. [15]

[viscosity of CNT nanofluids (pH=6.0]

SEM image of randomly aligned BP formed by filtration without rotation.

SEM image of BP formed under rotation at 500 rpm. The arrow indicates the direction alignment during filtration.

Representative I-V curves for BP samples produced in the absence of shear (red) and at (blue) measured both parallel and perpendicular to the direction of flow.

Summary of electrical conductivity measurements performed on BP in directions parallel and perpendicular to the direction of flow at various shear rates.

Representative stress-strain curves for BP produced in the absence of shear and a $\gamma'=1000\ s^{-1}$ in directions both parallel and perpendicular to flow.

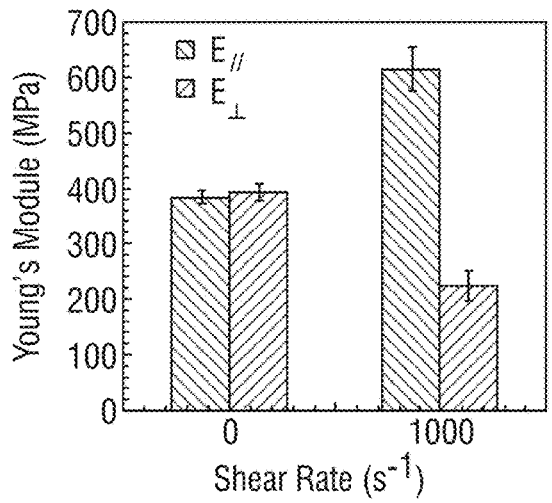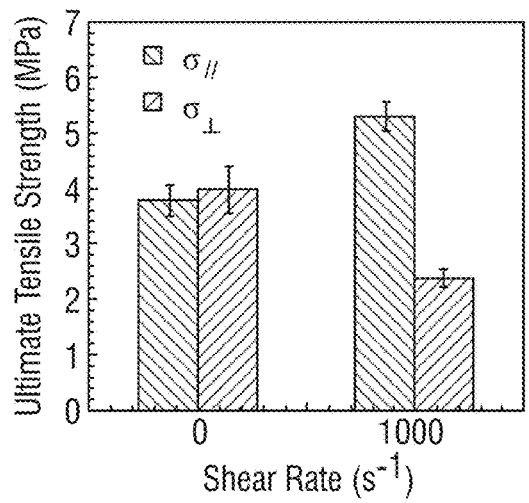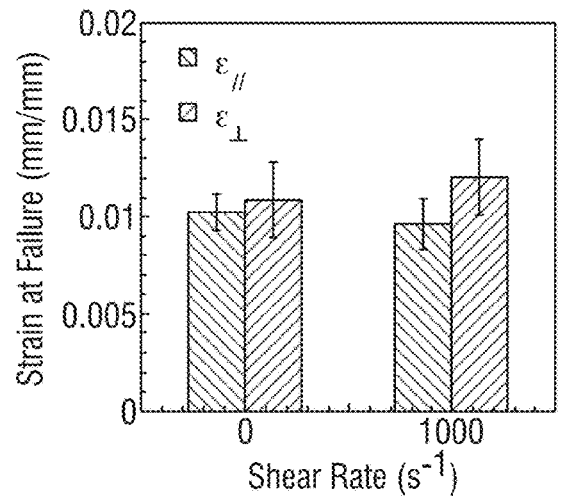
Summary of mechanical properties for BP prepared in the absence of shear and at in directions both parallel (◨) and perpendicular to flow (◪).

METHOD, APPARATUS, AND SYSTEM FOR PRODUCING BUCKYPAPER OR SIMILAR SHEET OR LAYER OF ELONGATED NANOSTRUCTURES WITH A DEGREE OF NANOSTRUCTURE ALIGNMENT

I. CROSS-REFERENCE TO RELATED APPLICATIONS

This is a Divisional Application of U.S. Ser. No. 14/334,755, filed Jul. 18, 2014, which is herein incorporated by reference in its entirety.

II. BACKGROUND OF THE INVENTION

A. Field of the Invention

The present invention relates to fabrication of buckypaper or an analogous sheet or layer with some degree of alignment of nanostructures having some elongation in at least one direction and, in particular, to utilization of fluid flow dynamics to influence filtered collection of the nanostructures from a suspension of the nanostructures.

B. Related Art

Nanostructures are materials with at least one dimension on the order of nanometers in scale. Much work is being done to develop applications for them, either individually or in agglomeration. Nanostructures with elongation in one direction can be fibers (nanofibers) or other structures having an axis of elongation or an aspect ratio well above 1. One example is tubes (nanotubes). Another example is nanocellulose fibrils. Another example is nanoribbons.

Carbon nanotubes (CNTs) are allotropes of carbon with a cylindrical nanostructure. They are members of the fullerene structural family and resemble graphitic sheets rolled into tube shapes. Rolling angle and radius influence their properties. They have been found valuable for, inter alia, nanotechnology, electronics, optics and other fields of materials science and technology.

Both single-walled (SWCNT) and multi-walled (MW-CNT) varieties of CNTs have been synthesized and both exhibit outstanding mechanical, thermal, and electrical properties. These extraordinary properties have prompted a great deal of research into the efficient synthesis of CNTs, and today high quality MWCNTs are commercially available at huge quantities and low cost (~$120/kg). As a result, high-volume engineering applications of MWCNTs are becoming a reality after decades of promise at the laboratory scale. One of the most promising immediate applications of MWCNTs is as filler in composites, specifically polymer matrix composites. However, composites fabricated by mixing multi-walled carbon nanotubes (MWCNTs) into a resin are limited to low loading levels because the large increases in viscosity that occur at higher loadings encumber processing. This, in turn, limits the effect that MWCNTs can have on the composite properties, and new methods must be developed if the true potential of CNT composites is to be realized. One way to achieve high loadings of CNTs in a composite is through the use of buckypaper (BP), which is a free-standing mat of tightly packed CNTs formed by the controlled filtration of CNT solution. FIGS. 1A and 1B show the typical method used to produce BP and optical images of the BP itself. BP can be handled in a manner similar to glass and carbon fiber mats, and traditional composite processing techniques such as compression molding and vacuum-assisted resin transfer molding can be used to infiltrate resin into the pores of the BP mat and bind several plies together into composites. See references[3, 4] (bracketed numbers refer to the listing of References later in this description). See also L. Hussein et al., Phys. Chem. Chem. Phys. 13, 5831 (2011), incorporated by reference herein. Loadings up to 60 wt % MWCNTs have been achieved [5] and outstanding mechanical, [6,7] thermal, [8] electrical, [7] and electromagnetic shielding properties [9] have been realized in BP/epoxy composites. Most BP is composed of CNTs that are randomly aligned. However, as with any fiber-reinforced composite, optimal properties are realized when the fiber alignment is unidirectional within each ply and the composite layup is judiciously tailored to match the expected stress state of its application.

However, as well-recognized by those in this technical field, the extremely small size of nanostructures and their properties present substantial challenges regarding their handling. What might work with macro-sized discrete items may not work with nano-sized structures.

Three approaches currently exist for the production of aligned BP mats: alignment through mechanical stretching of cross-linked CNT mats, "domino pushing" of aligned CNT forests, and magnetic alignment. Mechanical stretching involves uniaxially straining randomly aligned MWCNT BP and then impregnating it with resin. Bismaleimide (BMI)/BP composites made with this process possessed outstanding mechanical and electrical properties, [5] and, when the MWCNTs in the BP were functionalized with epoxide groups, the resulting composites exhibited unprecedentedly high strength (3081 MPa) and modulus (350 GPa), surpassing even high-performance carbon fiber composites. [10] See illustration at FIGS. 2A and 2B and [34] (see D. Wang et al. Nanotechnology 19, 609 (2008), incorporated by reference herein). However, the MWCNTs used in this study were cross-linked together through a specialized synthesis process necessary to prevent the BP from tearing at high strains, which excludes the method from widespread industrial use in the near future. Additional discussion of mechanical stretching can be found at Cheng Q, Bao J, Park J, Liang Z, Zhang C, Wang B. High Mechanical Performance Composite Conductor: Multi-Walled Carbon Nanotube Sheet/Bismaleimide Nanocomposites. Advanced Functional Materials. 2009; 19(20):3219-25 [5] (use of mechanical stretching or drawing to align CNTs), which is incorporated by reference herein.

Highly aligned BP can also be produced through "domino pushing" of MWCNT forests. See illustrative at FIG. 3. In this method, vertically aligned MWCNT forests are grown on a Si substrate and are subsequently pushed over by physically rolling over the forest with a cylinder. BP produced in this way has higher electrical and thermal conductivity in the direction of alignment. [20] However, this method is also not amenable to large-scale use, as MWCNT forests with very high degrees of vertical alignment must be grown, a process that is currently only possible in a few laboratories. Ding W, Pengcheng S, Changhong L, Wei W, Shoushan F. Highly oriented carbon nanotube papers made of aligned carbon nanotubes. Nanotechnology. 2008; 19(7): 075609. [20] (use of mechanical rolling or "domino pushing" to align CNTs) gives further discussion of this approach, and is incorporated by reference herein.

Magnetic alignment is an alternative method developed by Smalley [21] and refined by Liang and coworkers. [22] This method involves filtering CNTs in the presence of an applied magnetic field. Because CNTs have anisotropic magnetic susceptibilities, they tend to align with the direction of applied magnetic field lines in order to minimize energy. See illustration at FIG. 4. If a sufficiently strong magnetic field is applied to MWCNTs that are very well dispersed in solution, the MWCNTs will become oriented, and subsequent filtering will lead to the formation of aligned BP. Individual nanotubes comprising a MWCNT can be metallic or semiconducting depending on their structure with paramagnetic or diamagnetic responses to applied magnetic fields, respectively, both of which tend to align the MWCNT in the same direction and with nearly the same force. [23-25] However, huge magnetic fields on the order of 10-30 T are required to produce observable degrees of alignment. [21] The cryogenically-cooled electromagnets needed to achieve those massive magnetic fields render this method unfit for the production of aligned BP on any appreciable scale. Additional discussion of the magnetic alignment approach can be found at published patent application US 2002/0185770 to McKague (use of magnetic fields to align CNTs), which is incorporated by reference herein.

McKaque U.S. 2002/0185770 describes some of the issues in this technical field, including the challenges faced trying to achieve CNT alignment. McKaque discusses the potential benefits from such things as an efficient way to produce mass quantities of BP; with an effective degree of CNT alignment to produce anisotropic and other beneficial properties, and the ability to produce composites containing improved loadings of CNTs relative to simple melt or resin mixing.

Thus, the state of the art recognizes there is a need for aligned buckypaper fabrication techniques. But as discussed above, suggested solutions leave room for improvement in terms of flexibility, efficiency, complexity, economy, and applicability to a wide range of types of nanostructures.

III. SUMMARY OF THE INVENTION

It is therefore a principle object, aspect, advantage, or feature of the invention to provide methods, apparatus, and systems for improving over the state of the art.

Further objects, aspects, advantages, or features of the invention are to provide a method, apparatus, or system for producing BP or analogous end products with elongated nanostructures fixed in some directional alignment which:
a. is relatively economical and non-complex;
b. works for most, if not all, types of NTs as well as at least some other elongated nanostructures;
c. can be scaled up or down to produce different sized BP sheets or similar agglomerations; and/or
d. has flexibility and adjustability regarding a number of parameters, including degree of directional alignment in the resulting agglomeration.

In one aspect of the invention, a method of creating a macro-scale mat or sheet made of elongated nanoscale structures from the Fullerene structural family includes creating a dispersion of nanostructure and fluid with the nanostructures at a predetermined dilution, using fluid flow dynamics to influence some degree of alignment of the nanostructures in the fluid, and agglomerating or aggregating the influenced nanostructures into the mat or sheet. At least in the case of CNTs, compared to the starting random orientations, a degree of alignment can produce beneficial material properties. Examples can include but are not limited to anisotropic electrical and mechanical properties.

One specific example of practicing the above method is filtering the dispersion to substantially block and collect the nanostructures across a macro-scale area but allowing passage of the remainder of the dispersion after or while subjecting the dispersion to shear forces. The combination of actions on the dispersion promotes shear thinning of the dilution and at least a degree of alignment of the nanostructures along their axes of elongation as the nanostructures are formed into the macro-scale mat or sheet (BP for CNTs).

One example of a method and apparatus of imparting shear thinning is with Taylor-Couette flow. Filtering can be through a porous section of the inner tube of a Taylor-Couette set-up. Collection of the nanostructures by progressive build-up on top of the filter produces the sheet or mat. The method can be scaled within reason. Variables can be adjusted to influence the amount of alignment in the sheet or mat.

In another aspect of the invention, an apparatus for making buckypaper or the like of nanostructures includes at least one surface or boundary along which a dispersion of elongated nanostructures and fluid can flow. A flow generator is controllable to generate a shearing rate in the dispersion effective to promote preferential alignment of the nanostructures in the flow. An agglomeration or aggregation component isolates the nanostructures into a layer that can be processed into a free-standing sheet.

In one specific example, the apparatus can have an elongated axis includes a fluid chamber; a fluid outlet from the chamber; a fluid permeable surface between the fluid chamber and the fluid outlet; means or components to generate fluid flow dynamics that tend to influence nanostructure alignment (one example being fluidic shearing forces at or near the permeable surface) when the chamber contains a dispersion of the nanostructures and a carrier fluid.

In one specific apparatus, the shearing forces can be produced in a Taylor-Couette type two concentric cylinder assembly. At least one of the cylinders is operatively connected to an actuator or motor to rotate it relative to the other at a speed designed to set up shear stress in the direction of the desired alignment of CNTs in the dispersion at and across a filtering section of the inner cylinder.

In another aspect of the invention, a sheet of elongated nanostructures is made by the process of providing a dispersion of fluid and the nanostructures, influencing nanostructure alignment with fluid flow, and forming an agglomeration or aggregation of aligned nanostructures that can be processed into a free-standing mat or sheet.

In one specific example, the agglomeration is formed by placing a filter over a fluid outlet; directing the dispersion to the filter; and controlling flow of the dispersion to create shear forces substantially in one direction at or near the filter; so that the nanostructures are influenced to align in the direction and deposit in a layer on the filter. The deposited layer is removed from the filter to isolate a sheet of elongated nanostructures (BP for NTs) with a degree of alignment. The sheet can be utilized in a wide variety of applications similar to other BP but has both fabrication benefits over existing state-of-the-art techniques as well as the benefits of anisotropy for at least one material property

IV. BRIEF DESCRIPTION OF THE DRAWINGS

FIGS. 13A-C are graphs illustrating different anisotropic mechanical properties for aligned BP versus non-aligned BP.

V. DETAILED DESCRIPTION OF EXEMPLARY EMBODIMENTS OF THE INVENTION

A. Overview

For a better understanding of the invention, one or more exemplary embodiments of forms the invention can take will now be described in detail. It is to be understood that the invention can take many forms and embodiments and those described below are neither inclusive nor exclusive.

The examples will be discussed in the context of CNTs, either SWCTs or MWCTs. However, the invention can be applied to other nanostructures that have elongation along one axis, including those with relatively high aspect ratios. Examples are nanofibers, nanotubes, nanoribbons, and nanocellulose. These categories include, for example, carbon nanofibers, boron nitride nanotubes, titanium dioxide nanotubes, zinc oxide nanowires, semiconducting nanowires (e.g. Si, InP, GaN), metal disulfide nanotubes, metal nanowhiskers, metallic nanowires (e.g. Ni, Pt, Au), insulating nanowires (e.g. $SiO_2$, $TiO_2$), and molecular nanowires (e.g. DNA).

Furthermore, the examples are illustrated in the context of a batch-mode production of BP, in the sense that individual single BP sheets are produced one-at-a-time. However, a continuous or at least semi-continuous process is possible. One example of filtering nanostructures from a dispersion is set forth in U.S. Pat. No. 7,459,121, incorporated by reference herein, which could be applied to recovery of aligned nanostructures from the present embodiment.

B. Generalized Method and Apparatus

Figure 5A:
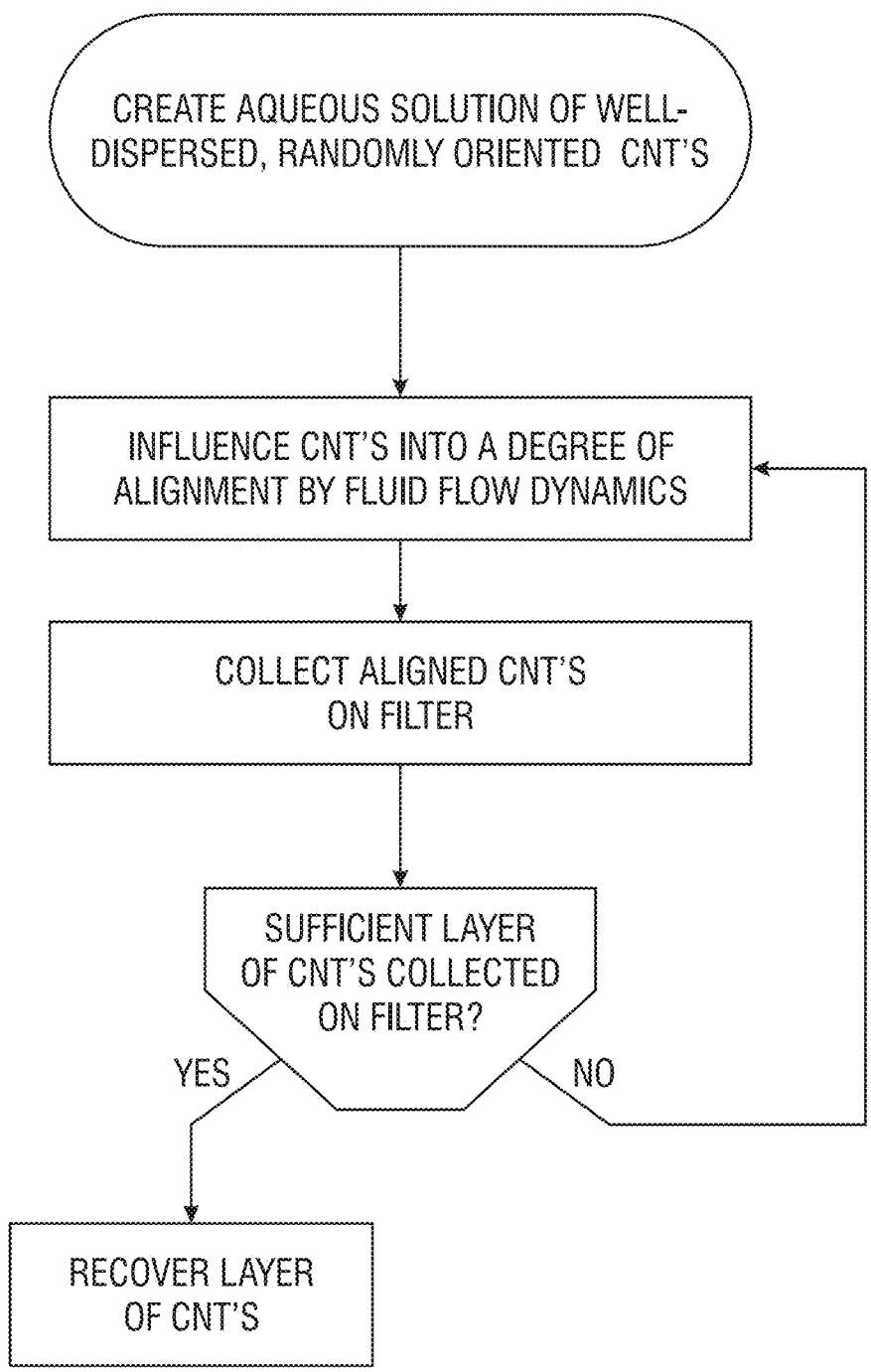
FIG. 5A is a flow chart of a method of creating aligned BP according to one exemplary embodiment and aspects of the present invention.

FIG. 5A describes anisotropic fabrication of a layer or sheet of elongated nanostructures by use of fluid flow dynamics to promote some degree of alignment along their axes of elongation. Instead of stretching, rolling, or magnetically inducing alignment of the nanostructures during production of BP, the method suspends the nanostructures in a water-based carrier fluid. Controlled fluid flow influences entrained elongated nanostructures towards alignment in the direction of flow is the technique of promoting alignment. Nanostructures with some degree of alignment, relative to their original randomly-oriented state, are then available for isolation, harvesting, collection in as much of that alignment state as possible for the formation of BP in the case of NTs, or in an analogous sheet, film, layer, or the like for other nanostructures with an aspect ratio significantly greater than 1.

The suspension originally includes a dilution of the nanostructures in the fluid at a pre-determined concentration. An example is NC7000 multiwall carbon nanotubes (MW-CNTs) commercially available from Nanocyl of Sambreville, BELGIUM, but a variety of elongated nanostructures can be utilized. As a general rule, the type of elongated nanostructures relevant to the methodology tend to be those with aspect ratios significantly greater than 1. While not so limited, one range might include aspect ratios on the order of 2:1 and above.

The nanostructures begin randomly oriented and well dispersed in the fluid. One way to do so is by sonicating the CNTs before mixing into the fluid, and composing the fluid of distilled water with a surfactant. An example of a surfactant is Triton X-100 commercially available from Dow Chemical Company, Midland, Mich., USA, but a variety of others are available and possible. The surfactant chosen can depend on the material being suspended and the fluid. The surfactant can beneficially have one component having favorable interaction with the material and one component with favorable interaction with the fluid. The "component" is usually a portion of the molecule (functional group, chain, or branch). Amphiphilic molecules are often good choices, as they have two components in the same molecule: one that is hydrophilic and one that is hyrdrophobic.

Using fluid flow dynamics, at least a substantial number of the suspended microscopic elongated nanostructures are influenced towards alignment in the same or similar direction at least to some degree more than the random orientation in the starting fluid. One way to promote alignment is with fluid flow dynamics. The processing can be an applied laminar shear flow. One fluid dynamic that could be used is shear forces. Shear forces tend to arise in fluid flowing along a constrained boundary. See FIG. 5B. Fluid along the interface with the boundary tends to flow slower than fluid away from it. This creates velocity variances in the direction of flow. At sufficient differences, shear forces are generated. The small but elongated nanostructures can be influenced by the shear forces to align in the direction of flow. The designer can select the flow technique and control parameters to influence alignment. Another example can be other methods of creating laminar flow that influences at least a substantial number of nanostructures into some degree of alignment. Empirical testing may be required to find the better control parameters for a needed or desired amount of alignment.

Once an effective degree of alignment of the nanostructures in the fluid is achieved for a given application, the nanostructures can be collected from the flowing fluid. One example is a free-standing sheet or layer (in the case of NTs formation of BP). Other elongated nanostructures should react similarly. Again, the designer can select the method and control parameters for this step. And other methods are possible. The paradigm shift from conventional methods allows such technical benefits as:

a. Non-complexity. The handling of nanostructures is not easy because of their extremely small size. Suspension in fluid allows them to be transported en masse while entrained in a flow of the fluid for processing using relatively non-complex and economical components.
b. Scale of processing. The scale of processing is adjustable within practical limits. Processing can be done one sheet at a time or plural processing paths in parallel. This improves over some conventional methods that presently have limitations on the size (length and width) of the sheet that can be produced.
c. Type of nanostructure. The process can be applied to most if not all types of nanostructure having a direction or axis of elongation in the sense that if fluid flow dynamics can influence some degree of alignment of orientation on the nanostructure, although aspect ratios of at least 2:1 may react better.
d. Adjustability. Because fluid flow dynamics can affect degree of alignment of the nanostructures, process controls can be implemented to produce BP or the like (sheet, mat, film, etc.) of different degrees of nanostructure alignment. Different degrees of alignment can produce different material properties. Examples include electrical, mechanical, and thermal properties, to name a few. And there can be meaningful anisotropy in at least one or more of those properties when compared parallel to direction of alignment versus off-parallel, and at least parallel versus perpendicular to direction of alignment. This allows the designer of the BP to have some control over degree alignment for different needs or desires.
e. Flexibility. At least the foregoing benefits afford the designer flexibility in design of sheets of the nanostructures (e.g. BP for NTs).
f. Economy. At least the foregoing benefits can be implemented in cost-effective components and processing methods.

As mentioned, one way to influence direction of nanostructures in suspension is by shear forces. Fluid constrained by at least one boundary generated shear when flowing. A volume of nanostructure/fluid dispersion is flowed or otherwise moved along such a surface. Boundary conditions generate forces that are exerted on the suspended nanostructures moving in the fluid. Examples of such forces are: shear created when fluid is forced through a confined opening (e.g. die) or pipe or when a fluid is confined between parallel plates and the plates are moved relative to each other.

In one example, once moving along the boundary, under certain conditions shear forces act to set up fluid flow dynamics which, if appropriately designed and controlled, result in flow patterns that influence directional alignment of the nanostructures in the fluid.

Figure 1A:
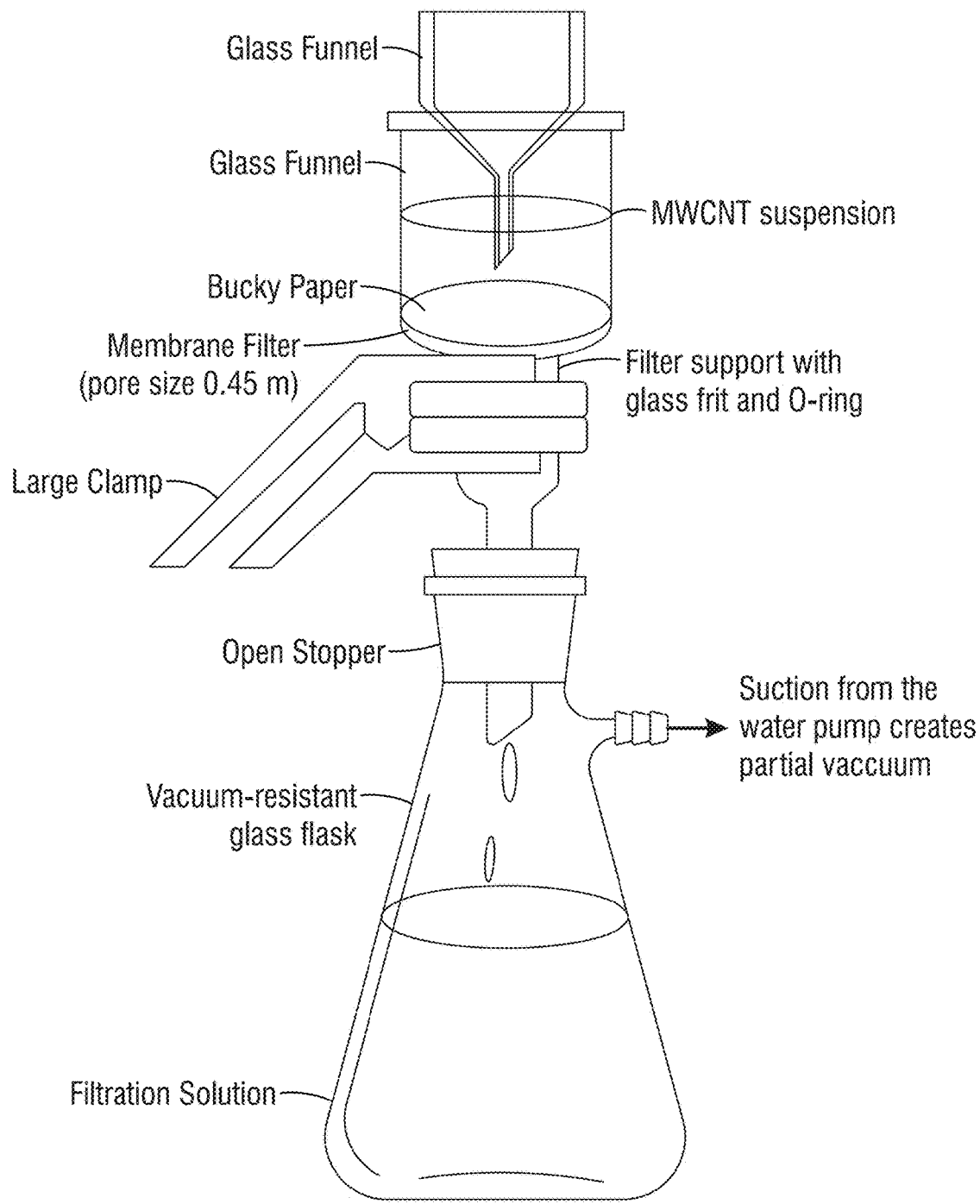
FIG. 1A is a diagram of a conventional set-up to produce randomly-aligned buckypaper.
Figure 1B:
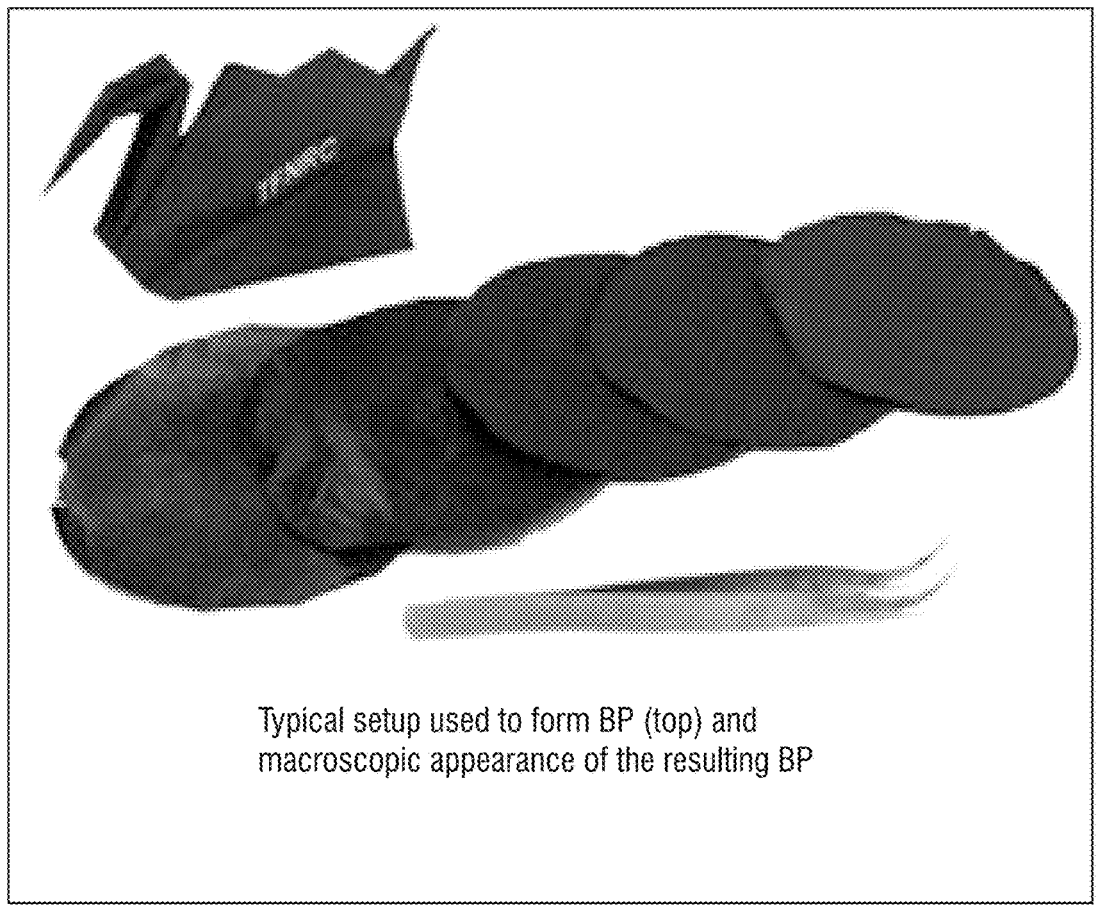
FIG. 1B is an enlarged picture of several sheets of BP produced by the system of FIG. 1A.
Figure 2A:
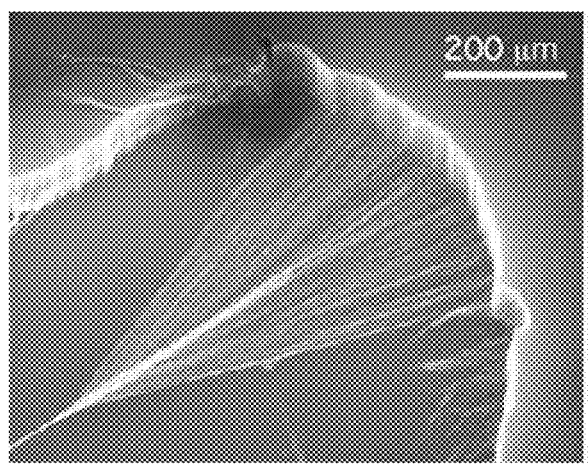
FIG. 2A is a photograph at greatly enlarged scale of a first conventional way of producing aligned BP (stretching/pulling).
Figure 2B:
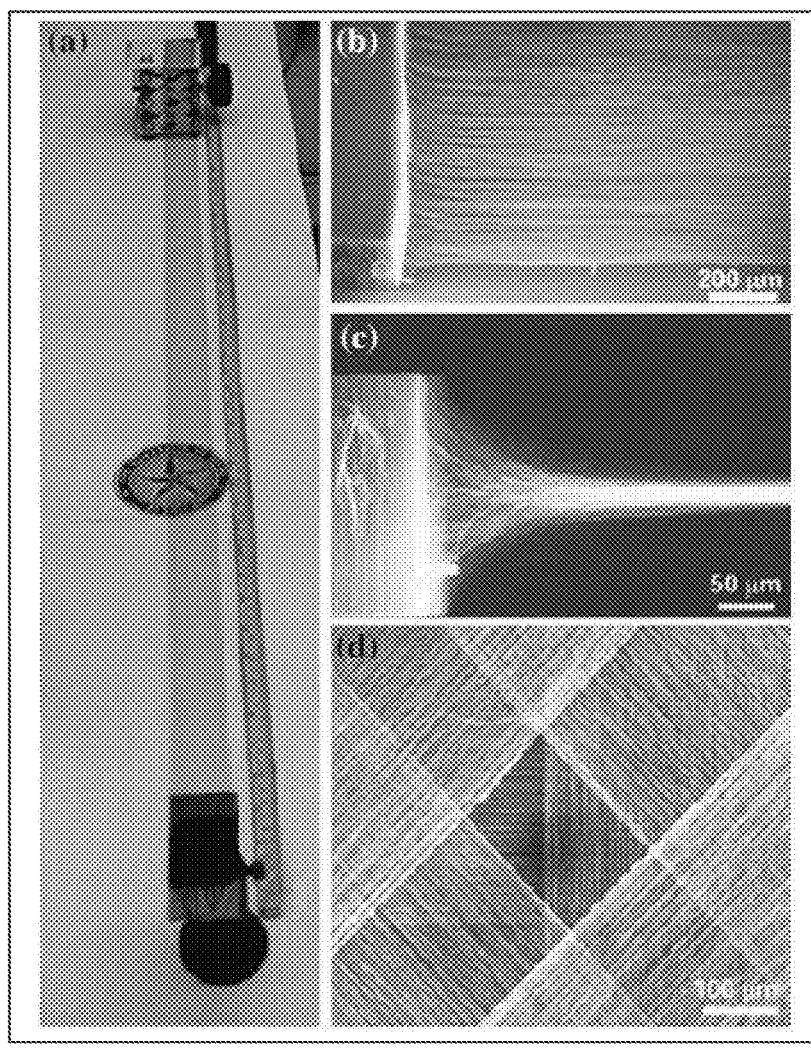
FIG. 2B are photographs of the stretching process and how the stretched fibers can be assembled into plies or multi-layers.
Figure 3A:
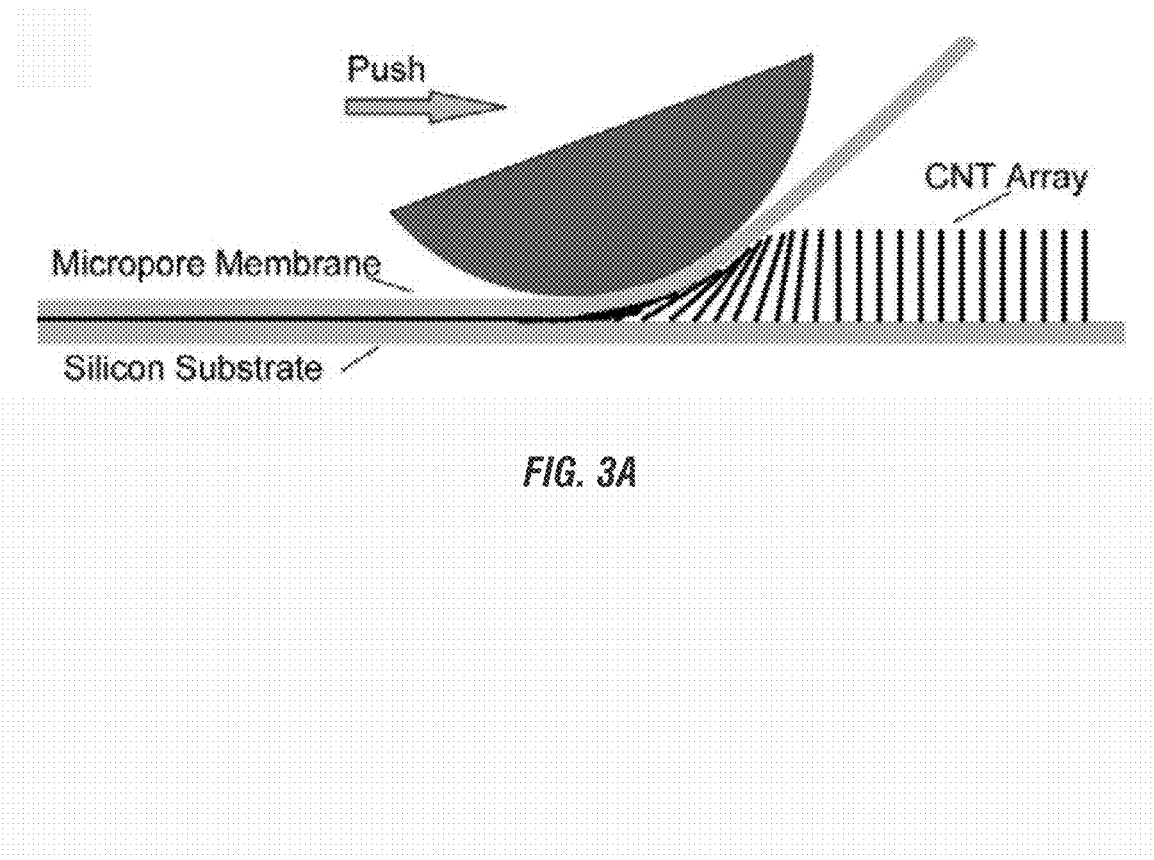
FIG. 3A is a diagram illustrating a second conventional way of producing aligned BP (domino rolling).
Figure 3B:
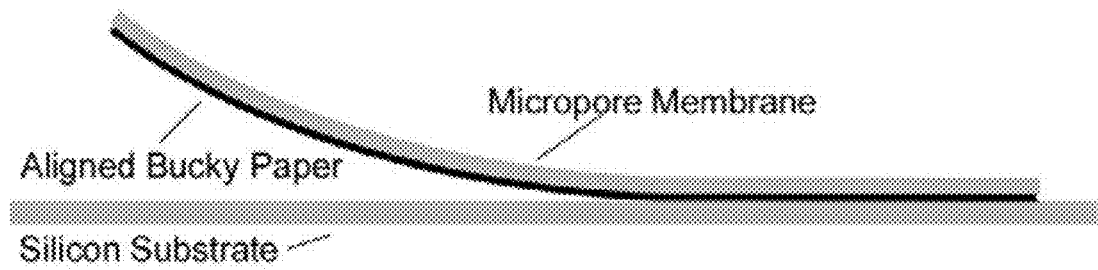
FIG. 3B is a diagram of how a sheet of aligned CNTs is removed from the set up to produce BP.
Figure 4:
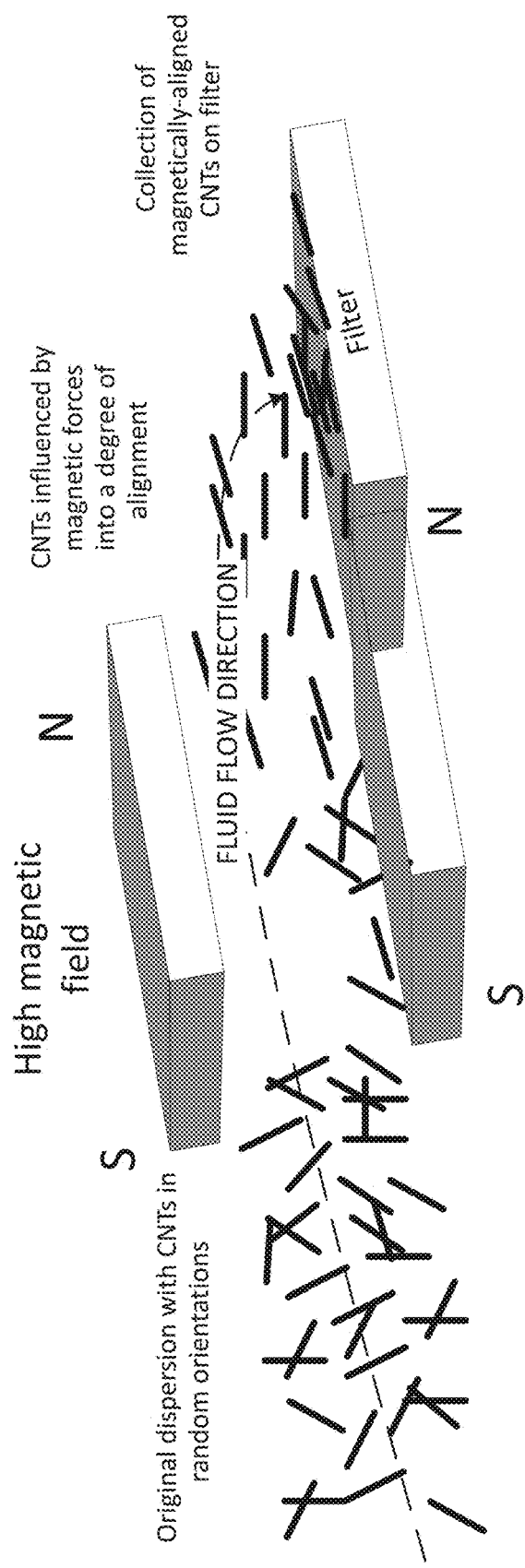
FIG. 4 is a highly diagrammatic view of a third conventional way of producing aligned BP (magnetic alignment).

Agglomeration, harvesting, or collection of these more aligned nanostructures (as compared with their starting orientations) across an area fabricates a sheet or mat of the nanostructures having some degree of alignment. In most examples, the agglomeration relies at least in part on inherent self-adhering nanostructure properties. One example of agglomeration, harvesting, or collection is shown in FIG. 1A. Some type of filter media of a given area (length and width) would be imposed along the fluid flow. The flow would be, at least in part, directed, influenced, or assisted through the filter media to catch and separate at least a substantial quantity of elongated nanostructures from the suspension to build up a free-standing sheet or film of nanostructures, and with a degree of alignment of the nanostructures instead of the random the orientations of FIG. 1A. Other techniques for agglomerating, aggregating, harvesting, or collecting could be centrifugal or gravitational separation.

Thus, in one example, the nanostructure/fluid dispersion is subjected to fluid flow shear and shear stress. Those dynamics are controlled to act upon the nanostructures to tend to align at least a substantial number of them. The dispersion or suspension is filtered to collect the aligned nanostructures across a filtered area. The collected nanostructures form a layer or sheet which can be isolated. One form of isolation of the sheet is to remove it without tearing, stretching, or otherwise materially affecting its desired properties. It is to be understood, however, that other methods of influencing alignment and harvesting nanostructures out of a flowing dispersion are possible.

Therefore, using fluid flow forces can influence alignment of nanostructures in suspension. This is a relatively inexpensive and non-complex method as compared to any of the three main present methods discussed in the Background of the Invention.

This is amenable to scaling up or down according to need or desire by varying the area of the filter.

It is amenable to an automated production process for commercial quantities of aligned sheet material.

Also, control of the process allows at least some control over the amount of alignment in the material.

Figure 5B:
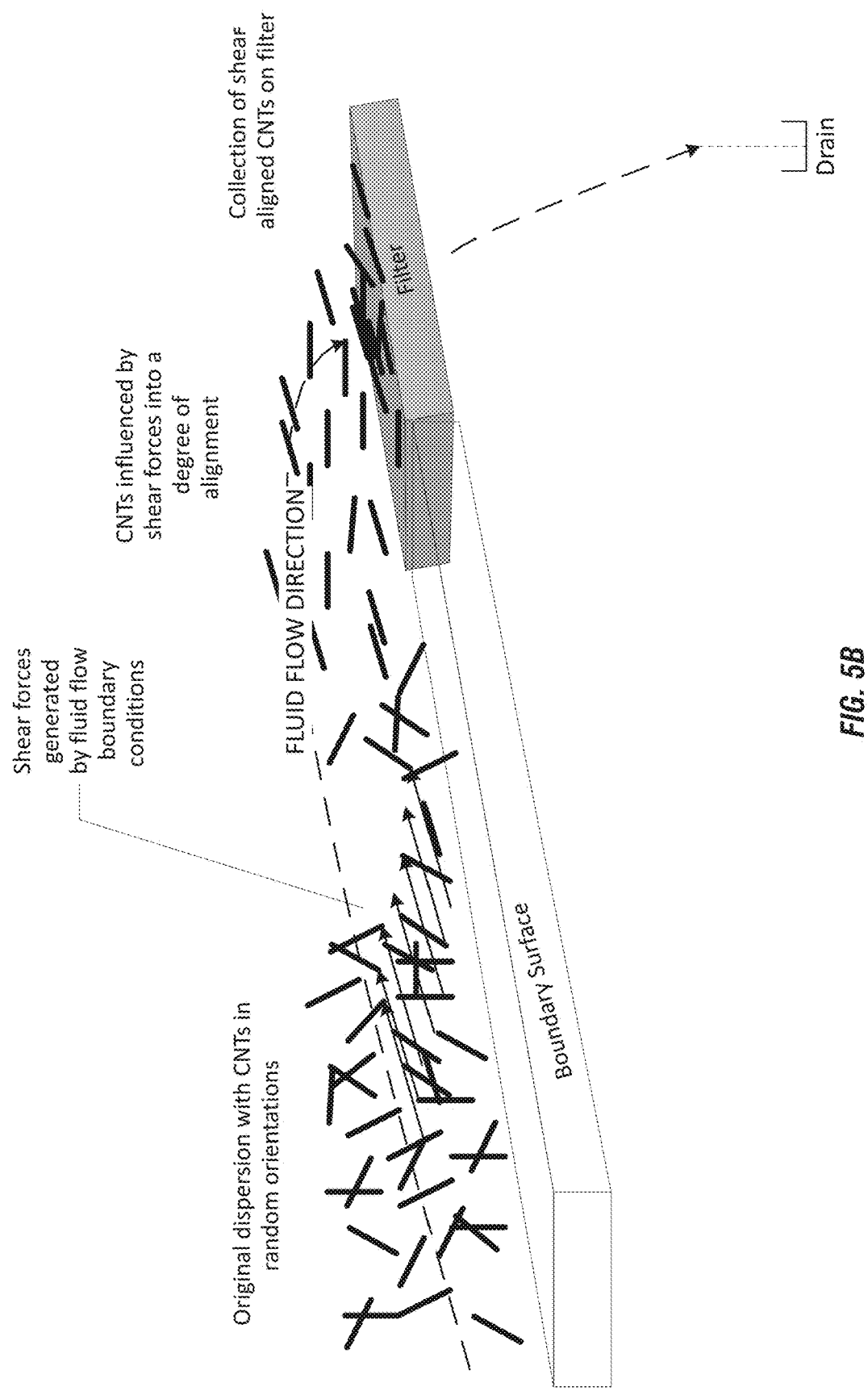
FIG. 5B is a highly diagrammatic illustration of how the method of FIG. 5A is implemented to create aligned BP or analogous product according to aspects of the present invention.

FIG. 5B is a highly diagrammatic view of an apparatus according to aspects of the invention. The pre-mixed dilution of randomly-oriented nanostructures in a carrier fluid is subjected to fluid flow dynamics by what will be called a flow generator effective to align a substantial number of nanostructures. They are then agglomerated by what will be called an agglomeration or aggregation component over an area to create a sheet or film of nanostructures with some degree of alignment compared to random orientation in the starting dispersion. One way is to collect the nanostructures from the flowing fluid over a filter area.

In one example, flowing fluid relative the boundary wall generated forces in the fluid flow act which influence alignment upon the microscopic nanostructures. One example can be setting up shear forces in the direction of flow as diagrammatically indicated.

A filter would be designed to stop (be impermeable to) at least a substantial amount of the nanostructures while allowing (be permeable to) the fluid to pass. Therefore, a sheet of nanostructures (e.g. BP for NTs) is collected on the filter.

But alternatives are possible to take advantage of using nanostructures in fluid suspension as a starting material for fabricating sheets like BP with some degree of nanostructure alignment.

Importantly, entraining the nanostructures in fluid and directing flow of the fluid is a scalable process that does not require the machinery and limitations of the stretching, rolling, or magnetic-field generation of the state-of-the-art methods discussed above.

A. Specific Example 1

A specific exemplary embodiment of a device and system to practice the generalized method described above is illustrated with reference to FIGS. 6-13 and any subparts. It is to be understood this is but one specific form the invention can take.

Anisotropic Buckypaper Through Shear Induced Mechanical Alignment of Carbon Nanotubes in Water

1 ABSTRACT

A simple method for aligning nanotubes in buckypaper (BP) with a modified Taylor-Couette system is reported. Using shear forces produced by a rotating cylinder to orient multi-walled carbon nanotubes (MWCNTs) in a surfactant-assisted aqueous dispersion, the suspended nanotubes are simultaneously aligned and filtered. The resulting BP is composed of nanotubes with preferential orientation in the direction of flow and possesses anisotropic electrical and mechanical properties, which are both enhanced parallel to the direction of orientation. The technique presented here requires no specialized equipment and can be implemented with any type of carbon nanotube (CNT) synthesized by any method. Furthermore, the size of the BP sheets can be easily increased by adjusting the length and diameter of the cylinders in the setup, offering the possibility for low-cost production of large quantities of oriented BP.

2 INTRODUCTION

Carbon nanotubes (CNTs) have been studied extensively over the last two decades because of their outstanding electrical, mechanical, and thermal properties, which makes them ideal candidates for use as reinforcement in multifunctional composites among other applications. [1, 2] However, composites fabricated by mixing CNTs into a resin are limited to low loading levels because the large increases in viscosity that occur at higher loadings encumber processing. This, in turn, limits the effect that CNTs can have on the composite properties, and new methods must be developed if the true potential of CNT composites is to be realized. One way to achieve high loadings of CNTs in a resin is through the use of buckypaper (BP), which is a free-standing mat of tightly packed CNTs formed by the controlled filtration of a CNT dispersion. BP can be handled in a manner similar to glass and carbon fiber mats, and traditional composite processing techniques such as compression molding and vacuum-assisted resin transfer molding can be used to infiltrate resin into the pores of the BP mat and bind several plies together into composites. [3, 4] Using this approach, composites containing up to 60 wt % MWCNTs have been achieved[5] and outstanding mechanical,[6, 7] thermal,[8] electrical,[7] and electromagnetic shielding properties[9] have been realized in BP-reinforced polymers. Most BP is composed of CNTs that are randomly aligned. However, as with any fiber-reinforced composite, optimal properties are realized when the fiber alignment is unidirectional within each ply and the composite layup is judiciously tailored to match the expected stress state of its application.

Several methods to align CNTs within BP films have been reported recently, which can be broadly classified as alignment through (i) mechanical stretching of cross-linked CNT mats, (ii) pushing or pulling vertically-aligned carbon nanotubes (VACNTs), and (iii) the application of large magnetic fields. Mechanical stretching involves uniaxially straining randomly aligned multi-walled carbon nanotube (MWCNT) BP and then impregnating the stretched nanotube film with resin. Bismaleimide (BMI)/BP composites made with this process possessed outstanding mechanical and electrical properties,[5] and, when the MWCNTs in the BP were functionalized with epoxide groups, the resulting composites exhibited unprecedentedly high strength (3081 MPa) and modulus (350 GPa), surpassing even high-performance carbon fiber composites.[10] However, the MWCNTs used in this study were cross-linked together through a specialized synthesis process necessary to prevent the BP from tearing at high strains, which excludes the method from widespread industrial use in the near future.

Highly aligned BP can also be produced from VACNT arrays, which consist of forests of densely-packed and highly aligned nanotubes. By pulling on a VACNT forest, van der Waals attraction among neighboring nanotubes causes the CNTs to assemble into continuous yarns or BP mats. [11-19] In addition to being spun by pulling action, VACNT forests can also be "pushed" down like dominos to form BP. This method has been implemented for vertically aligned MWCNTs using a cylinder to physically roll over and flatten the nanotube forest, and the BP produced in this manner exhibited higher electrical and thermal conductivity in the direction of alignment. [20] However, this method is also not amenable to large-scale use, as MWCNT forests with very high degrees of vertical alignment must be grown, a process that is currently only possible in a few laboratories.

Magnetic alignment is another nanotube orientation technique developed by Smalley [21] and refined by Liang and coworkers. [22] This method involves filtering CNTs in the presence of an applied magnetic field. Because CNTs have anisotropic magnetic susceptibilities, they tend to align with the direction of applied magnetic field lines in order to minimize energy. If a sufficiently strong magnetic field is applied to MWCNTs that are very well dispersed in solution, the MWCNTs will become oriented, and subsequent filtering will lead to the formation of aligned BP. Individual nanotubes within a MWCNT can be metallic or semiconducting depending on their structure with paramagnetic or diamagnetic responses to applied magnetic fields, respectively, both of which tend to align the MWCNT in the same direction and with nearly the same force. [23-25] However, huge magnetic fields on the order of 10-30 T are required to produce observable degrees of alignment. [21] The cryogenically-cooled electromagnets needed to achieve those massive magnetic fields render this method unfit for the production of aligned BP on any appreciable scale.

An alternative approach for aligning nanotubes in BP is outlined here. When subjected to shear forces in a fluid, CNTs align along the direction of flow. Using a modified Taylor-Couette system, an aqueous MWCNT dispersion is simultaneously sheared and filtered to produce BP with preferential nanotube orientation in the direction of flow. The aligned BP has anisotropic electrical and mechanical properties, which are both enhanced parallel to the direction of orientation. The technique presented here is simple and versatile in that it can be adapted for use with nanotubes synthesized by any method. In addition, the size of the BP can easily be increased using cylinders with larger dimensions. As a result, this approach offers an attractive route for producing large quantities of oriented BP at relatively low cost.

5.3 Experimental Details 5.3.1 Materials

NC7000 MWCNTs with an average diameter of 10 nm and purity of 90% were supplied by Nanocyl, S. A. (Belgium). A surfactant, Triton X-100 was purchased from Fisher Scientific (Waltham, Mass., USA). Nanotube dispersions were prepared by sonicating mixture of 1.5 g MWCNTs, 15 mL surfactant, and 750 mL DI water with a horn (Fisher, sonic dismembrator model 100) for 2 hours. The resulting dispersion was allowed to settle for 24 hours, and the well-dispersed supernatant was used to prepare BP films with a setup shown schematically at reference number 10 in FIGS. 6A and 6B. See FIG. 6A—Schematic of modified Taylor-Couette system used to simultaneously shear and filter MWCNT dispersions and FIG. 6B, a benchtop set up including the concentric tube apparatus 10.

5.3.2 Methods

The modified Taylor-Couette apparatus 10 was constructed from an acrylic outer cylinder 12 with a length of 30 cm and an inner diameter of 31.15 mm, and a high-density polyethylene Porex (Fairburn, Ga., USA) inner cylinder 14 having a length of 31 cm, an outer diameter of 26.00 mm and an average porosity of 60 μm. The inner cylinder 14 was sealed with adhesive tape 15 along its length, except over an 8 cm long section. An electric stirring motor 16 (Caframo, Ontario, Canada) with rpm control of ±1 rpm was used to rotate the outer cylinder at speeds up to 2000 rpm (e.g. by turning an axle 18 fixed to the bottom of outer tube 12). Compression fitted PTFE bushings 20T (top) and 20B (bottom) secured to the inner cylinder 14 maintained the inner tube 14 parallel to the outer cylinder 12 while allowing the two to be separated easily. A small fill tube 22 was inserted into a slit milled in the top bushing 20T to provide fresh dispersion during filtration, and a vacuum in the inner cylinder 14 was created by a belt-driven pump 24 (Welch, Niles, Ill., USA) via vacuum line 25. In all experiments, the top of the inner cylinder 14 was clamped to prevent rotation.

To fabricate BP using the setup 10, a 9 cm×8 cm strip of nitrocellulose filter paper 30 (Osmonics, Inc.) with an average pore size of 45 μm was affixed to the exposed porous section of the inner rod 14 by pulling the paper 30 tautly around the cylinder 14 and bonding the overlapping ends of the paper 30 with a small amount of adhesive. After the adhesive had cured, the inner cylinder 14 was inserted into the outer cylinder 12 and the gap 28 was filled with dispersion 32.

The outer cylinder 12 was rotated at a constant rate to shear the fluid 32, and vacuum was subsequently applied to the fixed inner cylinder 14 to force the dispersion through the filter paper 30. A BP sheet (e.g. BP sheet 34 of FIG. 7) formed on the filter 30, and the separated water was collected in a series of traps 36 (FIG. 6B). Fresh dispersion 32 was continually added from a container 38 of reserve dispersion via the fill tube 22 during filtration to maintain a constant fluid level in gap 28.

Figure 7:
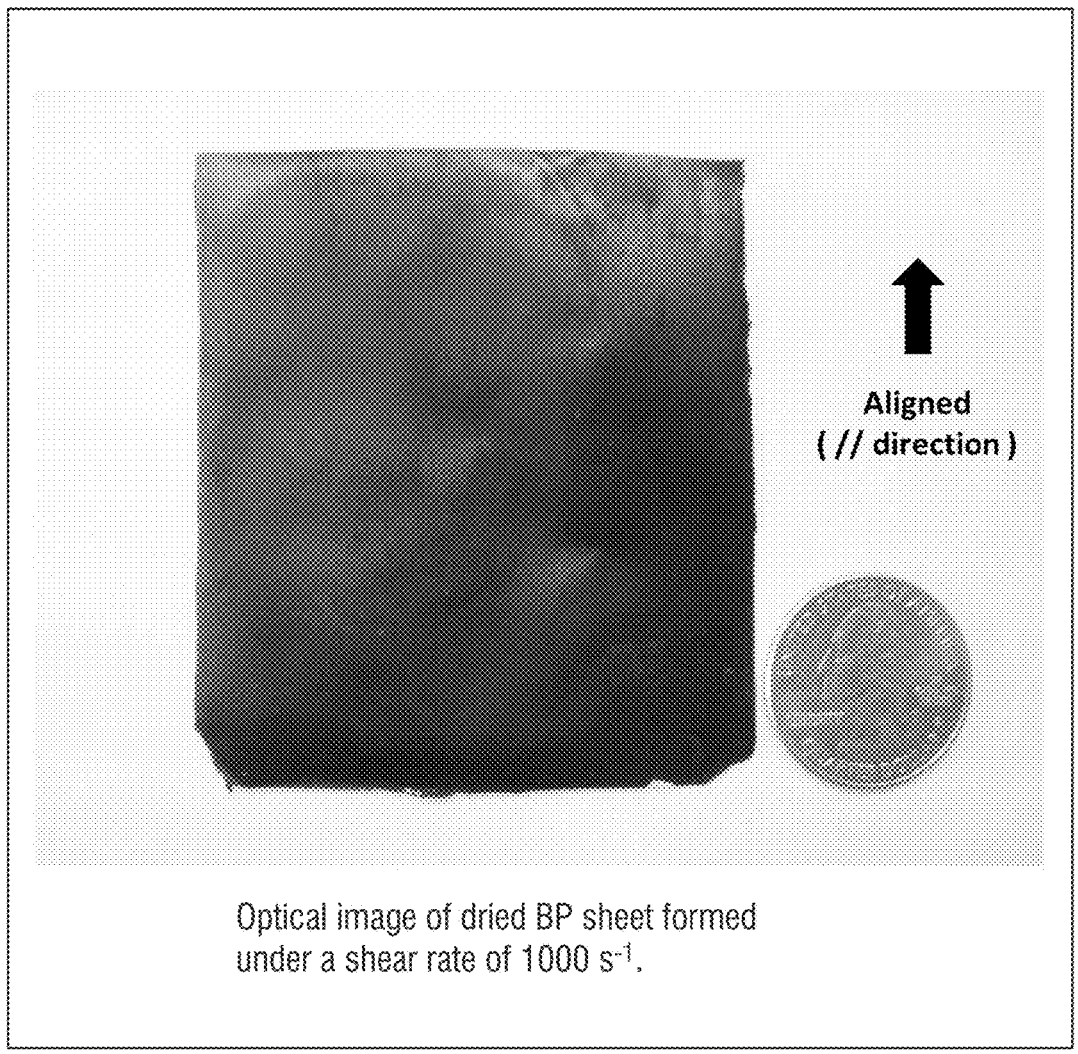
FIG. 7 is an enlarged plan view of a sheet of BP produced by the apparatus and system of FIGS. 6A and 6B.

After filtration, the inner cylinder 14 was removed from the setup and the filter paper 30 was cut along the overlapped edge to produce a rectangular sheet, which was dried in a vacuum oven at 100° C. for 12 hr. The dried BP 34 was then separated from the filter paper 30 by gently folding and peeling the nanotube mat 34 free from the filter 30. The resulting freestanding film of MWCNTs 34 was soaked in isopropanol overnight to remove any residual surfactant before drying once more in a vacuum oven at 80° C. for 4 hr. FIG. 7 shows a representative sample of BP 34 after processing. See, e.g., FIG. 7—Optical image of dried BP sheet formed under a shear rate of 1000 $s^{-1}$.

5.3.3 Characterization

The viscosity of the MWCNT dispersions was measured as a function of shear rate using an AR2000ex rheometer equipped with a Peltier temperature control stage and a 40 mm diameter cone ($\alpha=1°$, 0', 11"). Measurements were performed by placing 0.2 mL of dispersion 32 on the Peltier stage and equilibrating at 25° C. before performing a constant temperature, steady-state flow test at shear rates ranging from 1 to 1200 $s^{-1}$.

The degree of nanotube alignment in BP samples was monitored with scanning electron microscopy (SEM, FEI Quanta 200) operating at 8 kV accelerating voltage. Electrical conductivity measurements were performed using a linear four point probe (Jandel model RM2). For each test, a 1 cm×3 cm strip was cut from the BP either perpendicular or parallel to the direction of alignment, and conductivity measurements were made on the top surface of the paper with the four probes oriented parallel to the long axis of the strip. The thickness of each sample was averaged from 10 measurements taken along the length of the BP 34 using a digital micrometer (Mitutoyo). The anisotropic mechanical properties of BP samples were evaluated by tensile testing 0.5 cm×3 cm×100 μm strips cut either parallel or perpendicular to the direction of alignment. For each test, the BP strip was mounted in a flat-faced fixture and elongated with an Instron universal testing machine following a procedure similar to ASTM D882.

This alternative approach to the conventional ways of producing aligned BP is also illustrated at FIGS. 6C-G. It involves the use of shear forces to align MWCNTs in solution as they are being filtered. Like other fibers, CNTs align along the direction of flow 50 in a fluid subjected to shear 52. When a MWCNT solution is sufficiently dilute and well dispersed, shear thinning behavior is observed as fibers align and reduce drag (See FIG. 8B—illustrating shear thinning behavior of aqueous CNT dispersions as a function of temperature and concentration. [26]).

Figure 6A:
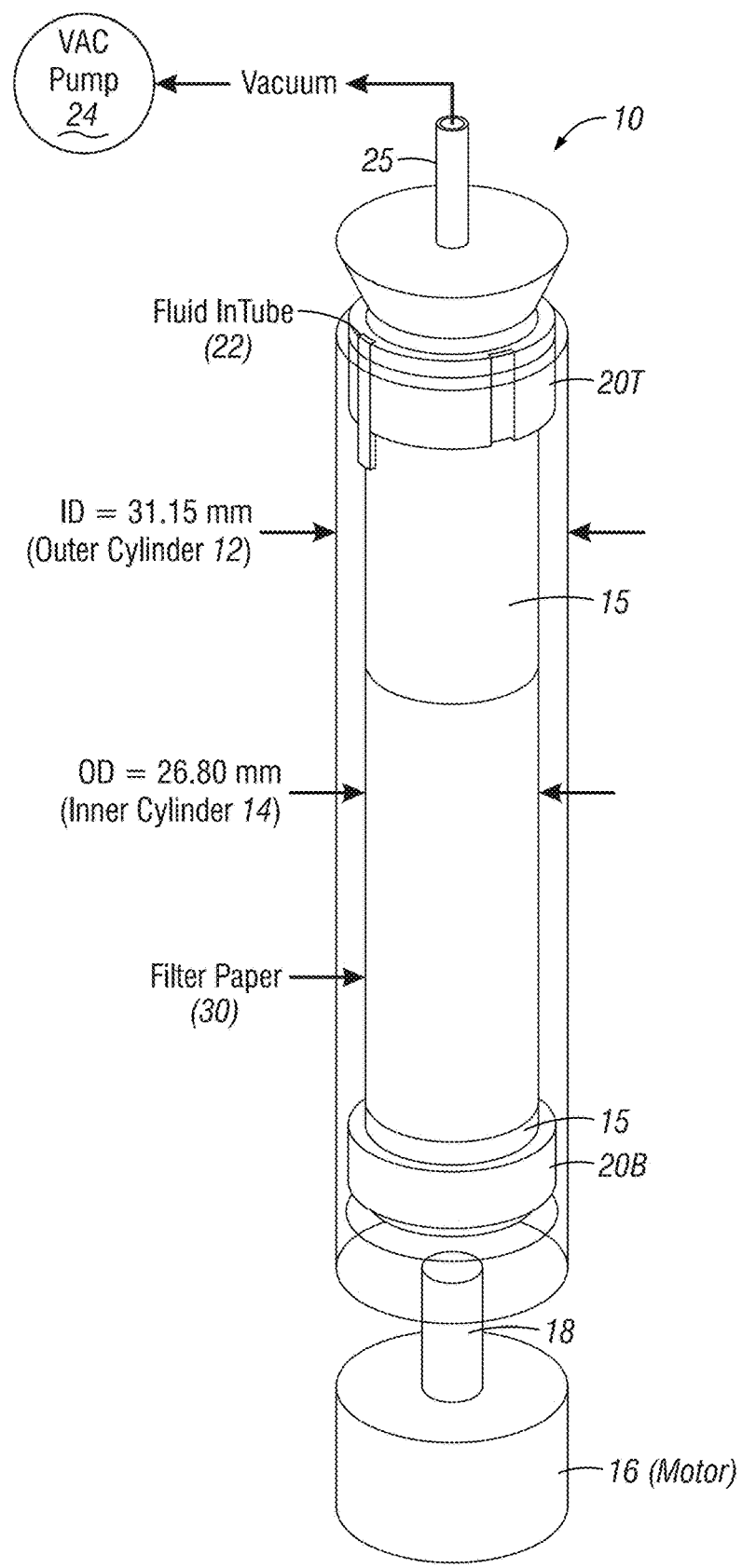
FIG. 6A is a front elevation view of a modified Taylor-Couette device for use in a specific exemplary embodiment according to the present invention.
Figure 6B:
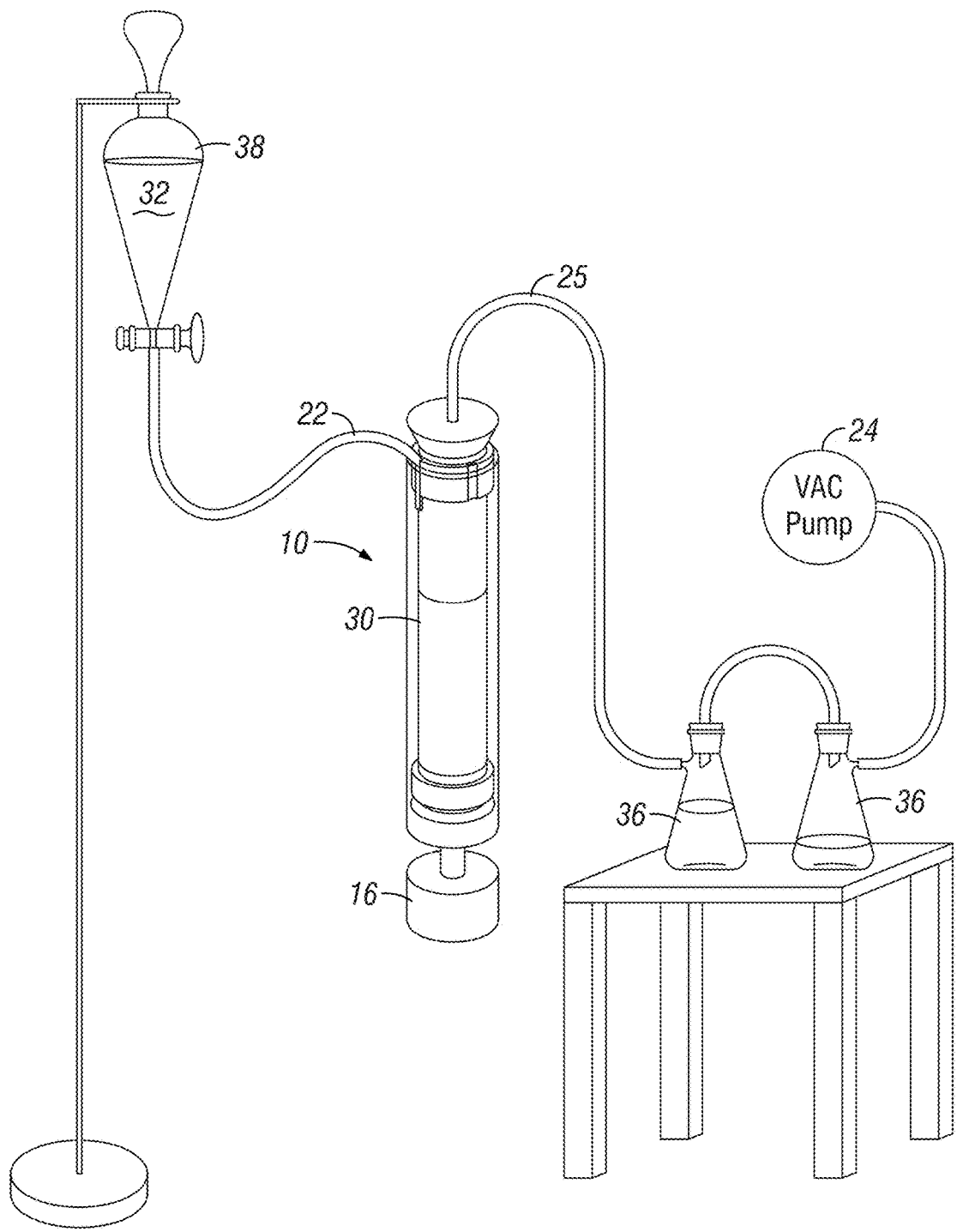
FIG. 6B is a diagrammatic view of a full system set up for producing BP using the modified Taylor-Couette device of FIG. 6A.
Figure 6C:
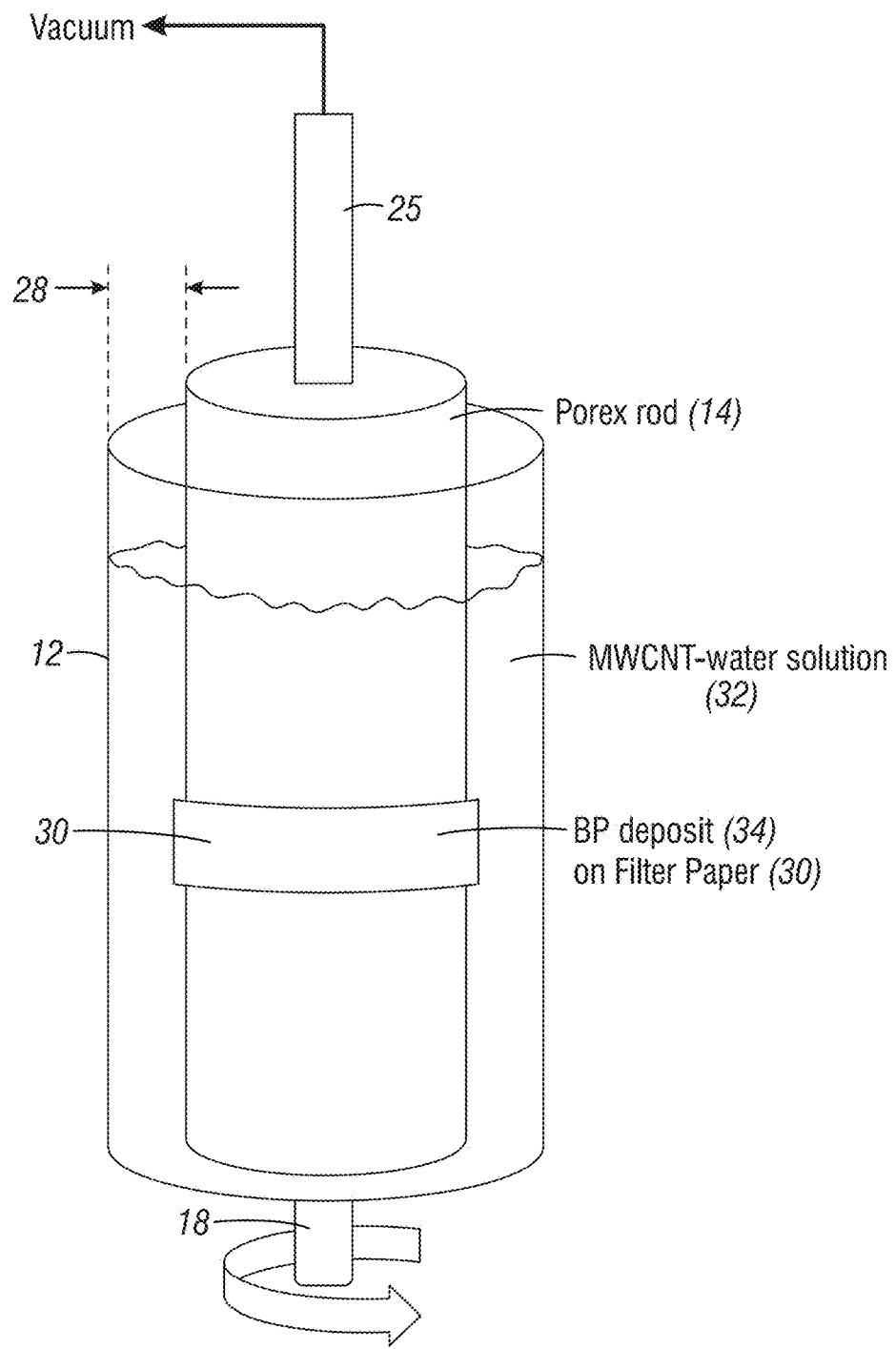
FIG. 6C is a simplified 2-D diagram of the modified device of FIG. 6A.
Figure 6D:
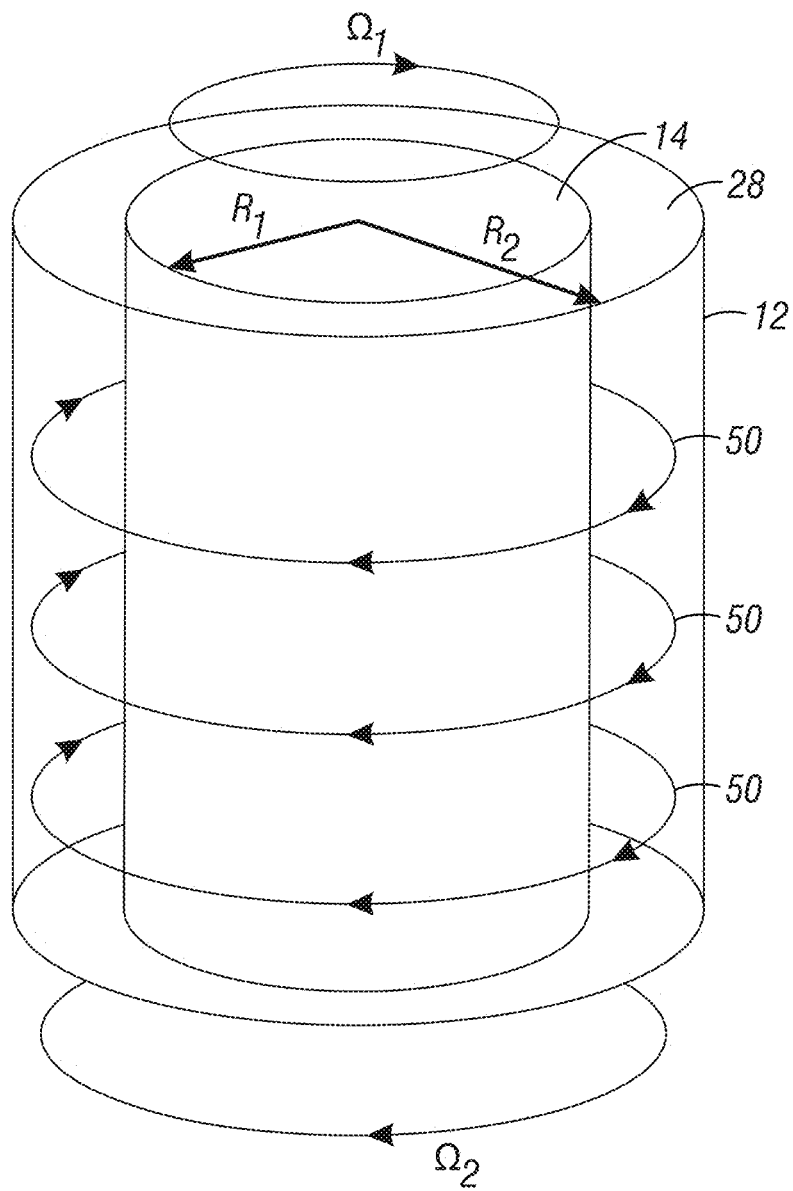
FIG. 6D is a perspective view diagram illustrating fluid flow in the device of FIG. 6A.
Figure 6E:
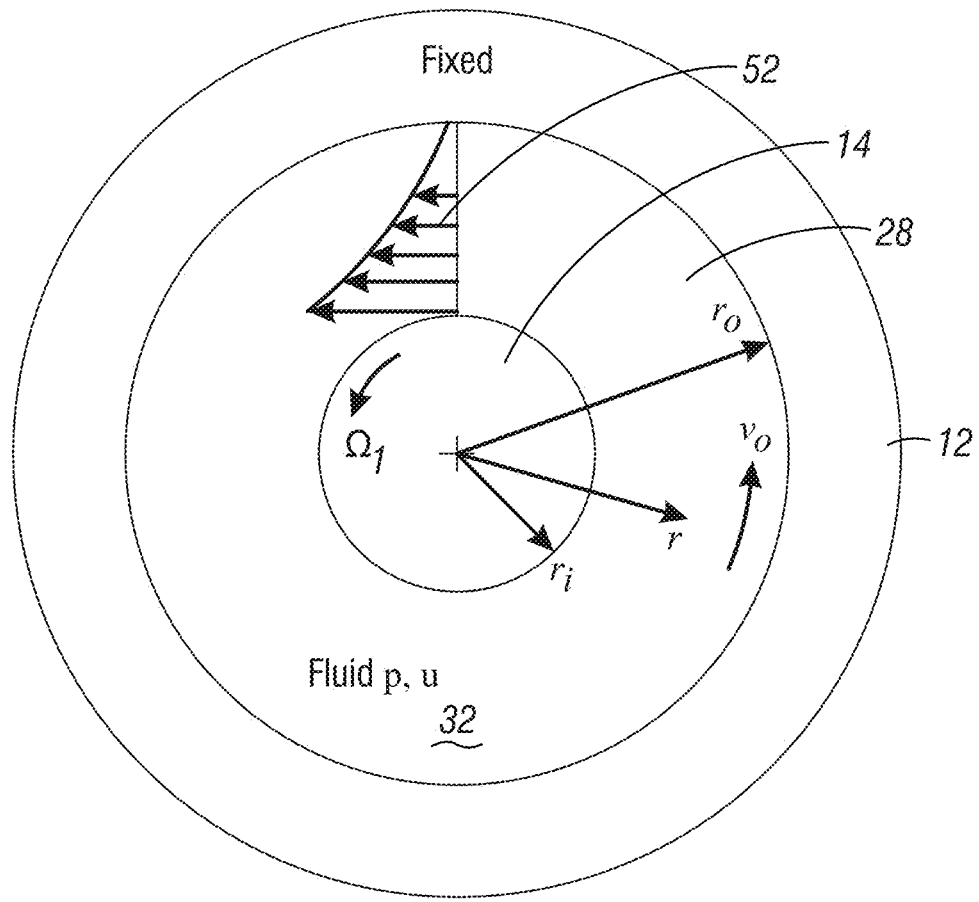
FIG. 6E is a cross-section view of FIG. 6D diagramming shear stress forces that can influence nanoparticle alignment in the fluid flow under certain conditions.

A classic setup to generate shear forces in fluids is the Taylor-Couette setup, which is shown schematically in FIG. 6C (See also FIGS. 6D and 6E—Schematics of Taylor-Couette cylinder. See also White, F M. Fluid Mechanics: WCB/McGraw Hill; 2003, including Chapter 4, ISBN: 0077422414).

B. Operation

By rotating the outer 12 and/or inner cylinder 14, shear forces develop in the fluid trapped between the two cylinders, and the magnitude of the shear is determined by both their radii and relative speeds. The shear rate produced by rotating only the outer cylinder 12 is given by: [28]

$$\dot{\gamma} = \frac{dv_\theta}{dr} \approx \frac{V_o - V_i}{R_o - R_i} = \frac{R_o \omega}{R_o - R_i} = \frac{\omega}{1 - R_i/R_o}$$

where $\dot{\gamma}$, $R_o$, $R_i$, and $\omega$ are the average shear rate, radius of outer cylinder, radius of inner cylinder, and angular velocity of the outer cylinder, respectively. Rotation of the outer cylinder 12 is desirable for aligning fibers in solution as it avoids turbulent transitions that can occur from instabilities associated with rotation of the inner cylinder 14.

Figure 6F:
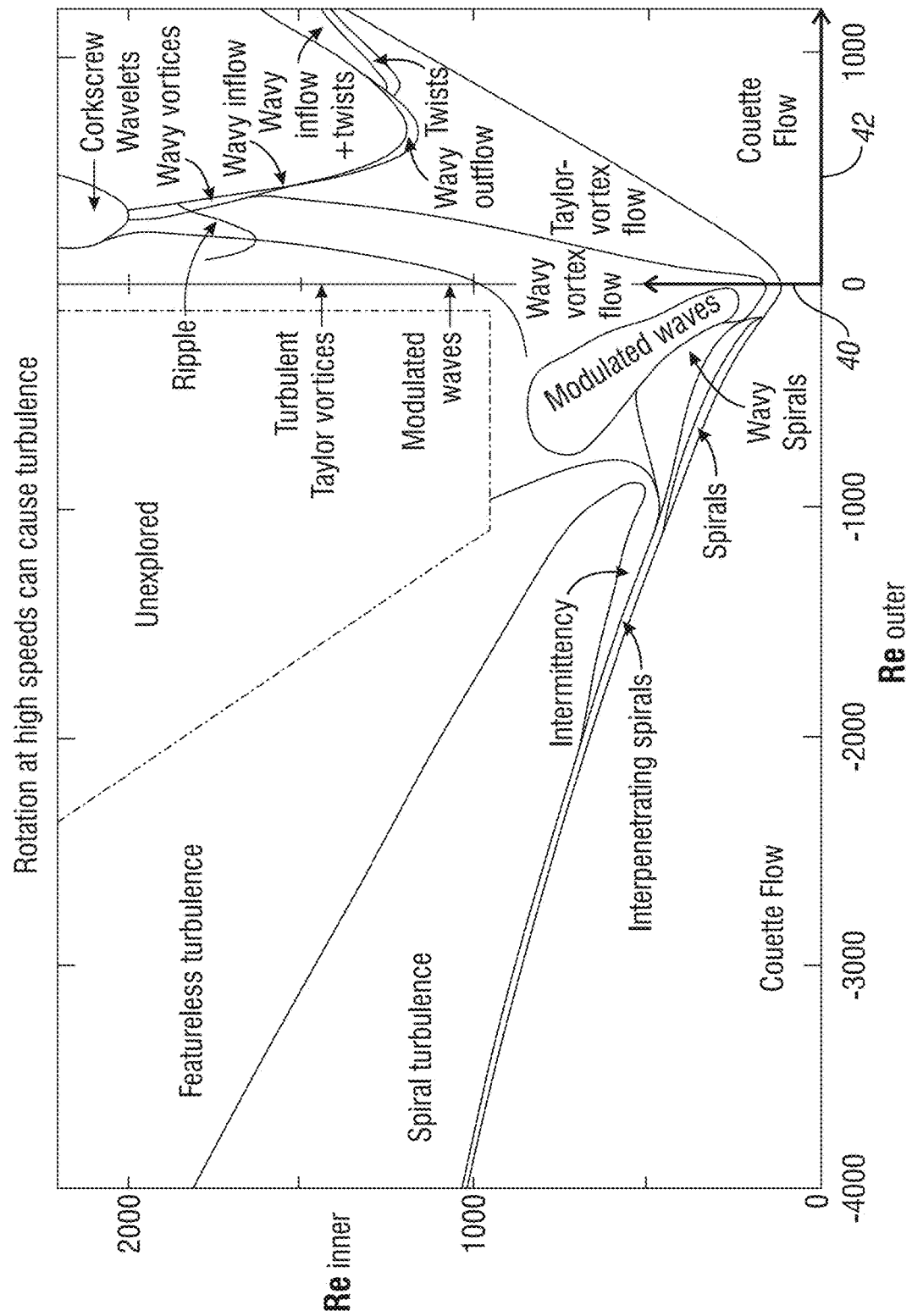
FIG. 6F is a diagram characterizing flow regimes for Taylor-Couette cylinders rotating at different velocities and resulting fluid dynamics, including discovered beneficial flow regimes applied to the device of FIG. 6A.

FIG. 6F (diagram of flow regimes for Taylor-Couette cylinders rotating at different velocities. [29]) shows the turbulent flow regimes that develop when the outer and inner cylinder are rotated at different relative Reynolds numbers, which are proportional to velocity. The arrow 40 represents the case of only inner cylinder rotation, and clearly turbulence occurs at much lower velocities than the case of only outer cylinder rotations (shown at arrow 42), in which laminar (Couette) flow is observed up to very high Reynolds numbers on the order of 10,000-15,000. See Coles D. Transition in Circular Cuoette Flow, Journal of Fluid Mechanics. 1965; 21(03): 385-425, which is incorporate by reference herein.

We have made aligned BP sheets by building a Couette-Taylor setup with an inner cylinder composed of Porex© polymer and the outer cylinder polycarbonate as shown in FIG. 6A and schematically in FIG. 6C. The outer cylinder 12 is rotated with an overhead mixing motor 16 capable of speeds up to 2000 rpm with digital rate control within ±1 rpm. Filter paper 30 is placed over the porous section of the Porex inner cylinder 14, and the top is connected to a vacuum line 25. A well-dispersed solution 32 of MWCNTs prepared by sonicating MWCNTs and Triton X-100 (surfactant) in distilled water is poured into the gap 28 between the two cylinders 12 and 14. The outer cylinder 12 is rotated to align the nanotubes through shear and vacuum is subsequently applied to filter the MWCNTs and form BP 34 on the inner cylinder 14. Various rotational speeds have been used to generate shear rates on the orders of 100-1000 s$^{-1}$.

The degree of anisotropy in the resulting BPs has been characterized with FE-SEM and four point probe conductivity measurements both parallel and perpendicular to the direction of alignment. In the future, composites will also be made from the BP by compression molding and vacuum infiltration of epoxy, and tensile testing and DMA (dynamic mechanical analysis or sometimes dynamic mechanical spectroscopy such as is known in the art) will be performed to determine mechanical properties as a function of orientation. See, e.g., Menard, Kevin P. (1999). "4". *Dynamic Mechanical Analysis: A Practical Introduction*. CRC Press. ISBN 0-8493-8688-8, incorporated by reference herein. Some preliminary results are summarized below.

C. Anisotropic Benefits

Figure 10A:
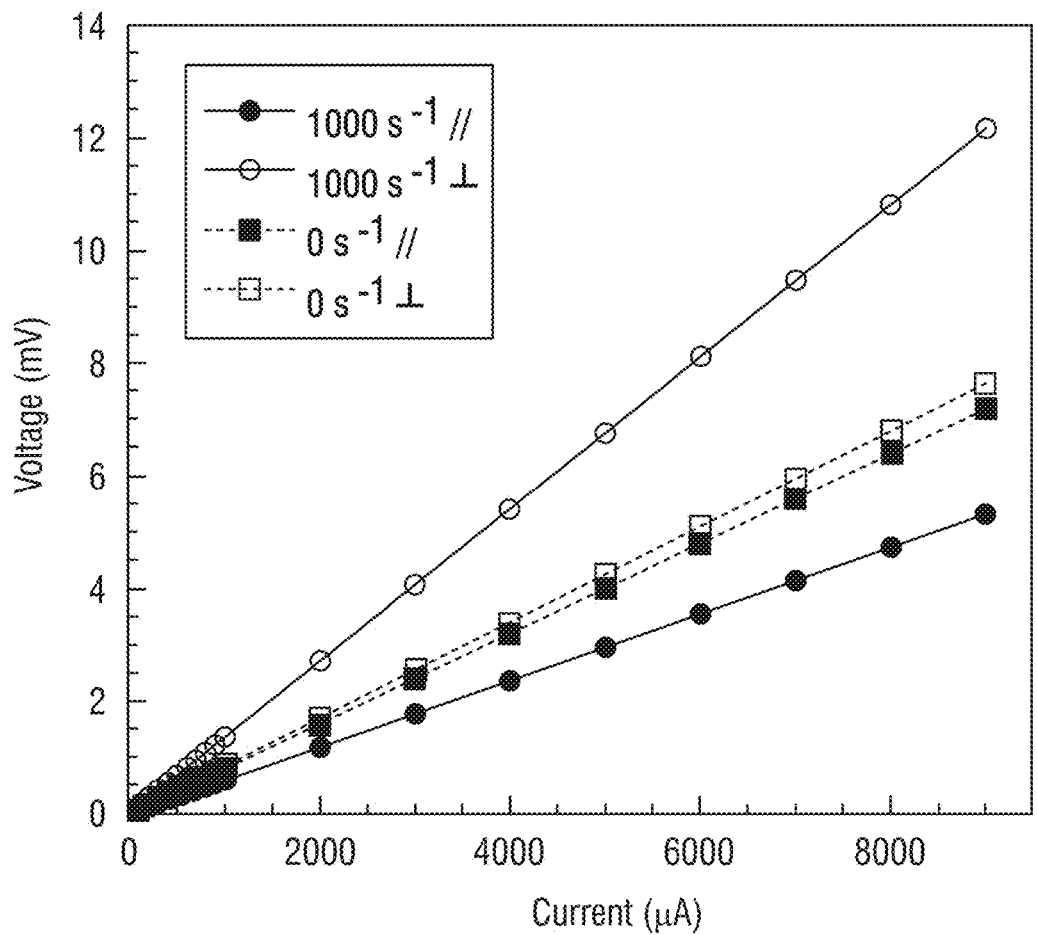
FIG. 10A is a graph illustrating demonstrated anisotropic electrical properties of aligned BP under certain conditions, as compared to non-aligned BP.
Figure 10B:
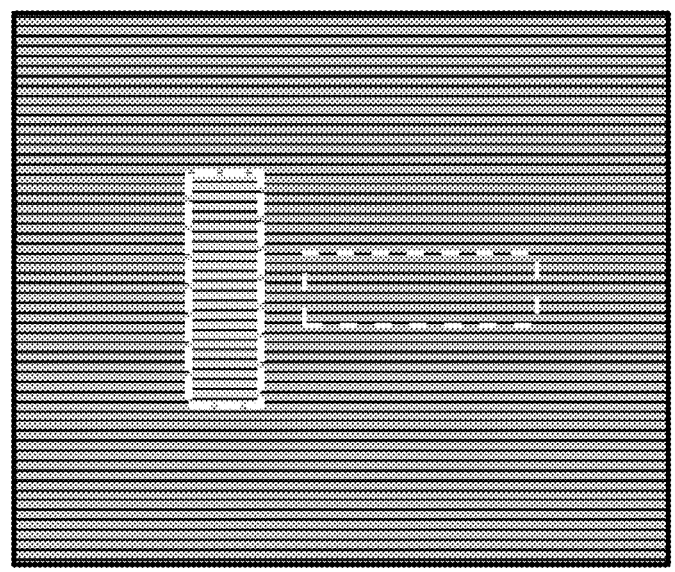
FIG. 10B is an illustration of how measurements such as FIG. 10A are made along and transverse to the direction of alignment in the BP.

FIG. 10A (Representative I-V curve obtained from four point probe measurements of randomly oriented BP) is a representative current-voltage (I-V) plot obtained from a four point probe measurement on non-oriented BP. FIG. 10B diagrammatically illustrates how the conductivity measurements were made on the BP sheet. The BP behaves as an Ohmic conductor as can be seen by the linear relationship between current and voltage, and, as a result, the electrical conductivity of the BP can be obtained from the slope of the I-V plot. Table 1 summarizes the conductivity of BP samples produced at different rotational speeds as measured both parallel ($\sigma_{//}$) and perpendicular ($\sigma_\perp$) to the direction of shear alignment. Randomly oriented BP produced by filtration without rotation had nearly isotropic electrical conductivity, as determined by the similar values of $\sigma_{//}$ and $\sigma_\perp$. An intermediate level of shear generated by rotating the outer Couette cylinder 12 at 500 rpm produced the greatest electrical anisotropy ($\sigma_{//}/\sigma_\perp \sim 2$), while samples produced under 1000 rpm rotation were nearly isotropic. The higher shear rate produced visible turbulence in the MWCNT solution, which likely led to random deposition of MWCNTs on the filter paper. Optimization of the shear rate is part of an ongoing investigation.

TABLE 1

Summary of anisotropic electrical conductivity of BP filtered under rotation at 0, 500, and 1000 rpm.

| Sample | $\sigma_{//}$ (S/cm) | $\sigma_\perp$ (S/cm) | $\sigma_{//}/\sigma_\perp$ |
|---|---|---|---|
| Random | 21.4 ± 0.8 | 19.2 ± 0.4 | 1.11 ± 0.1 |
| 500 rpm | 33.6 ± 3.4 | 16.9 ± 2.0 | 2.01 ± 0.4 |
| 1000 rpm | 24.6 ± 2.2 | 21.3 ± 0.7 | 1.16 ± 0.2 |

Figure 9A:
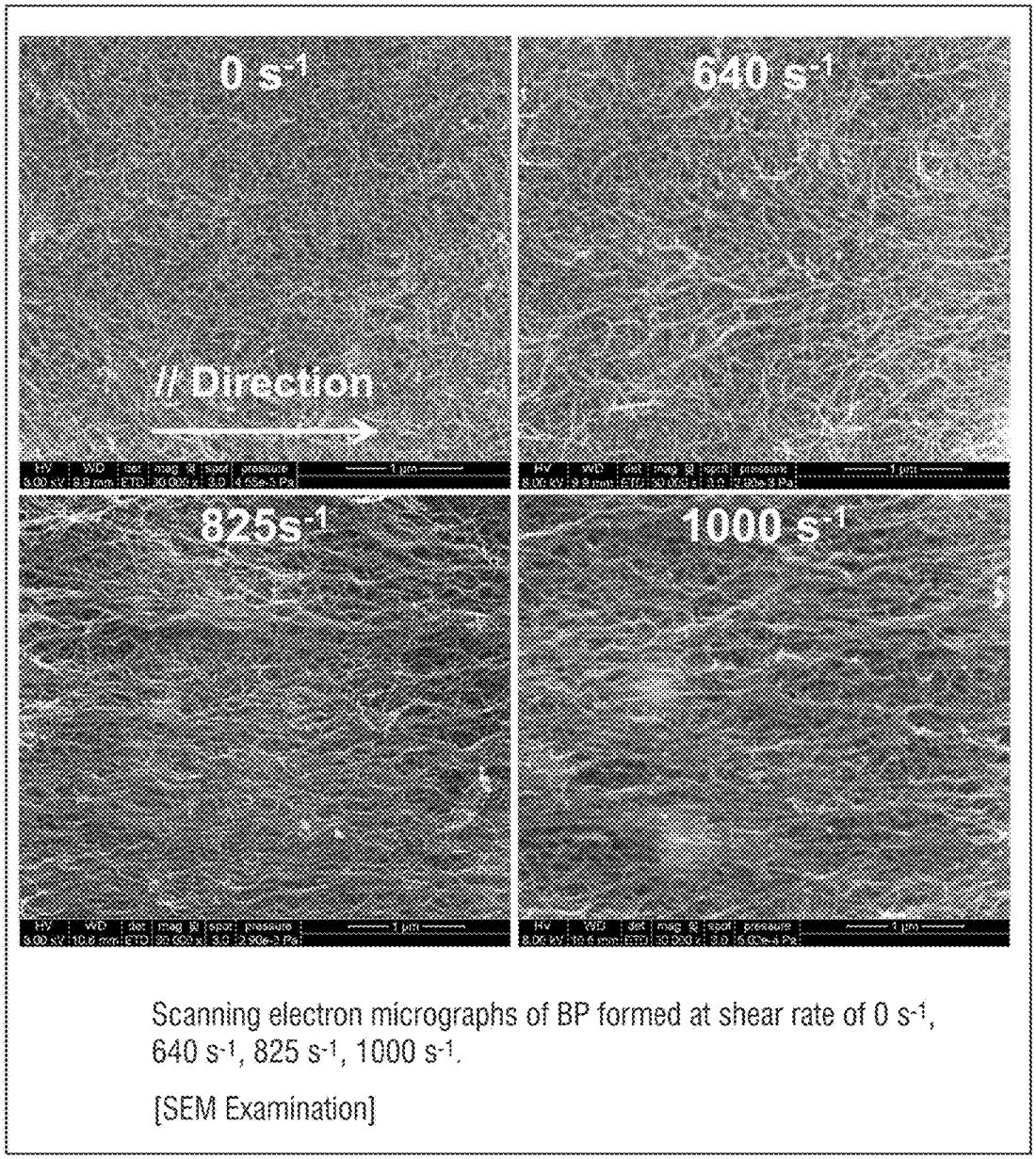
FIG. 9A is a set of greatly enlarged plan view photographs showing at microscopic scale different degrees of alignment for different shear rates for BP produced by the setup of FIG. 6B.
Figure 9B:
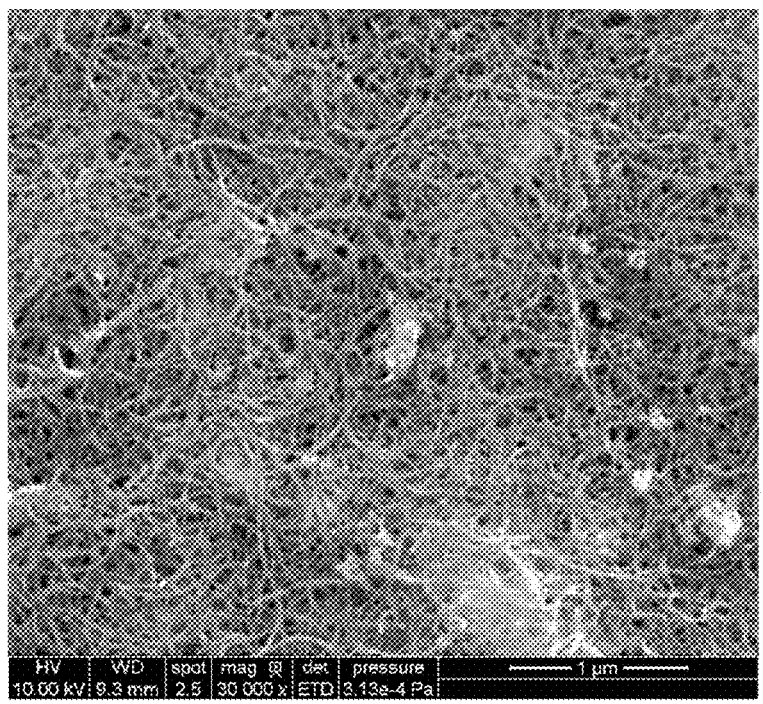
FIGS. 9B and 9C are plan view photographs similar to FIG. 9A showing unaligned (FIG. 9B) and a degree of alignment (FIG. 9C) of BP.
Figure 9C:
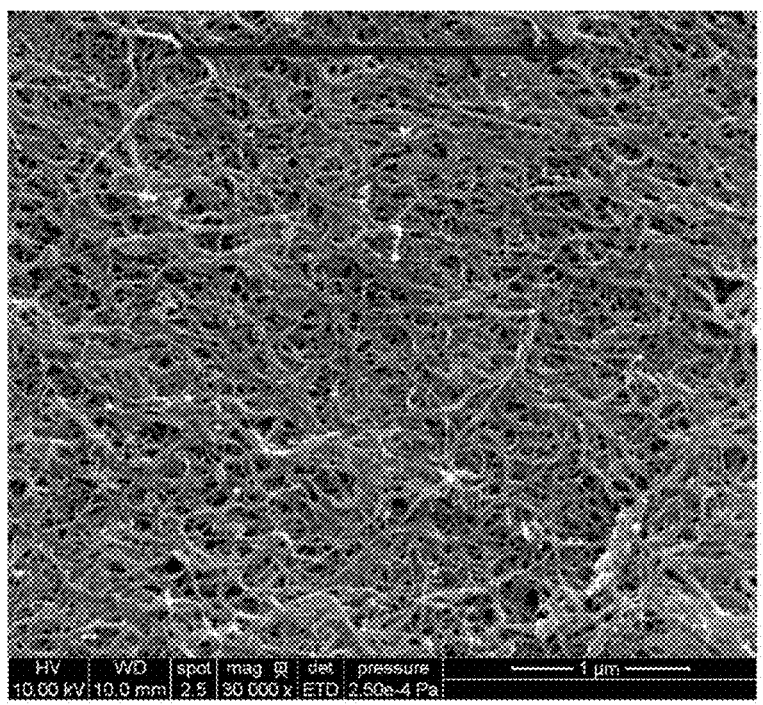

The BP discussed in this section was made using inner and outer cylinders with different diameters than that done with the cylinder dimensions described in experimental section above). The results in Table 1 and FIG. 9C are given based on rotational speeds instead of shear rates. These results are consistent with the other results. SEM images of the random and aligned BP are given in FIG. 9B (SEM image of randomly aligned BP formed by filtration without rotation) and FIG. 9C (SEM image of BP formed under rotation at 500 rpm. The arrow indicates the direction of alignment during filtration), respectively. Some degree of alignment seems apparent in FIG. 9C in the direction of shear, while FIG. 9B appears to contain MWCNTs with random orientation. In summary, we have developed a new and simple method of producing anisotropic BP through orientation and filtration of an aqueous MWCNT solution. Preliminary results have shown that BP formed at intermediate shear rates have anisotropic electrical properties, which could be of great value for use in composite and electronic applications.

Taylor-Couette flow and shearing action are well known and described in the literature. See, e.g., [28] (Darby) and [29] (Anderack), incorporated by reference herein.

FIG. 6D diagrammatically illustrates how flow 50 in gap 28 between cylinders 12 and 14 is parallel the circumference of inner tube 14 (and generally perpendicular to the longitudinal axis of inner cylinder 14). Flow is a function of relative radius $R_1$ of cylinder 14 and $R_2$ of cylinder 12, and relative angular velocities $\Omega_1$ and $\Omega_2$ respectively. FIG. 6E illustrates the shear forces 52 in direction of flow (at velocity $v_\theta$). It can be seen that shear forces 52 are along the circumferential flow direction.

FIG. 6F illustrates that Taylor-Couette flow must be controlled to avoid substantial turbulence. It also shows that rotation of the outer cylinder is preferred over rotation of the inner cylinder, as that will avoid turbulent transitions that will reduce the degree of nanostructure alignment relevant to nanostructure alignment influence by the flow. Arrow 42 in the figure shows the flow regime (Couette a.k.a. laminar) that occurs when the outer cylinder is rotated. Arrow 40 shows the flow regimes (many different turbulent types) that occur as the rotational speed of the inner cylinder is increased.

Figure 6G:
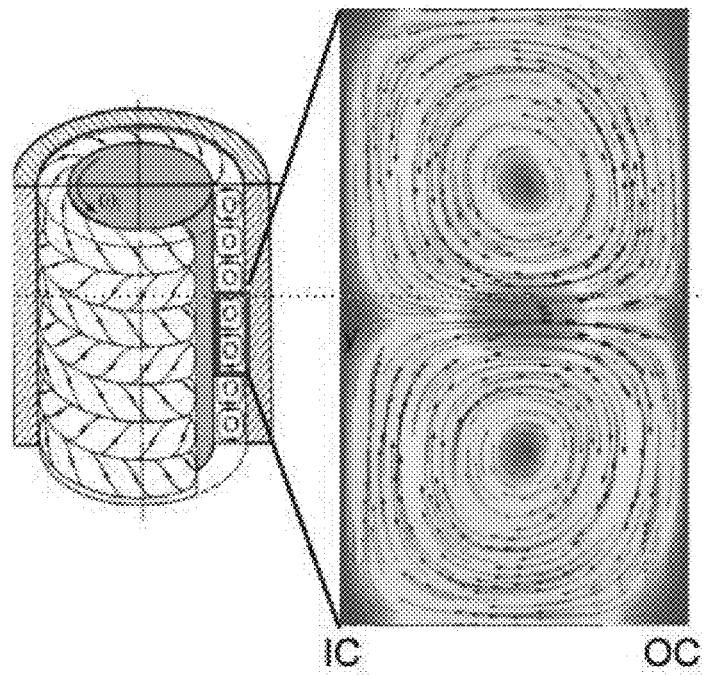
FIG. 6G is a perspective, partially sectioned diagram of flow patterns generated in a Taylor-Couette device such as FIG. 6A, and a 2-D projection of local flow dynamics inside the device for certain conditions.

FIG. 6G illustrates diagrammatically and with an isolated, expanded flow diagram from a vertical section of gap 28, and turbulent flow patterns that develop in the fluid if the inner cylinder is rotated too quickly and the viscosity of the fluid is low. It shows the fluid flow regime "Taylor vortices" that are described in FIG. 6F.

4 RESULTS AND DISCUSSION

4.1 Rheological Behavior of the MWCNT Dispersion

Figure 8A:
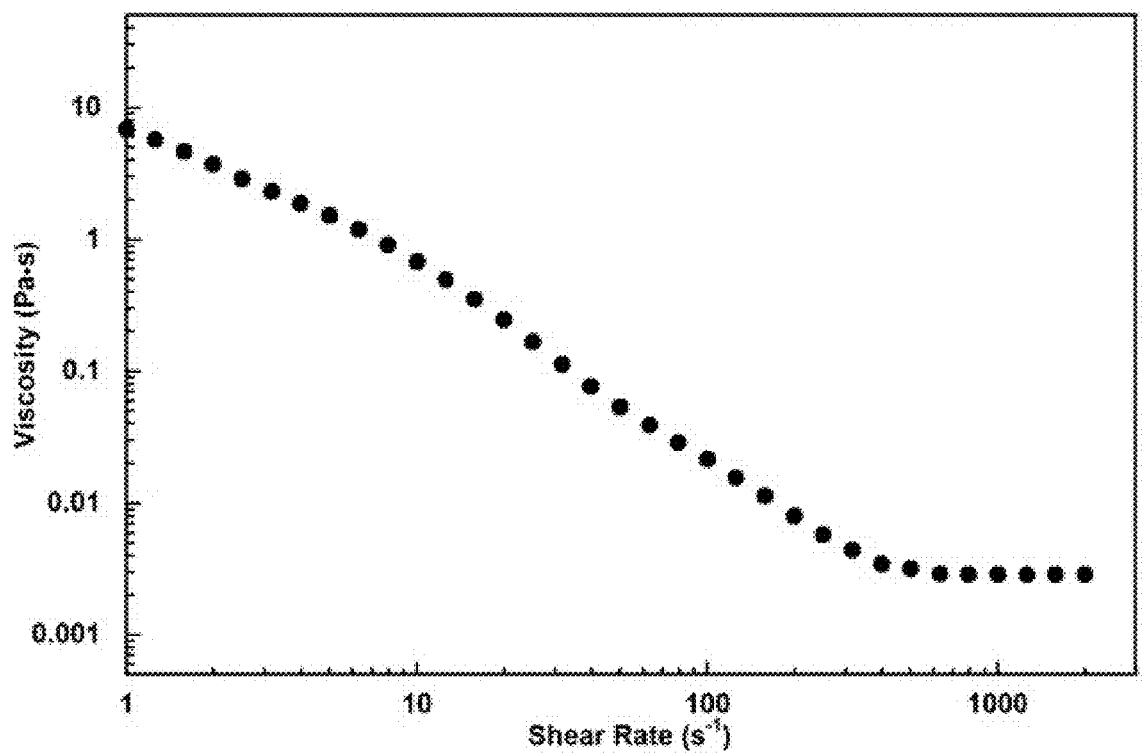
FIG. 8A is a graph illustrating shear thinning produced by the apparatus of FIG. 6A.
Figure 8B:
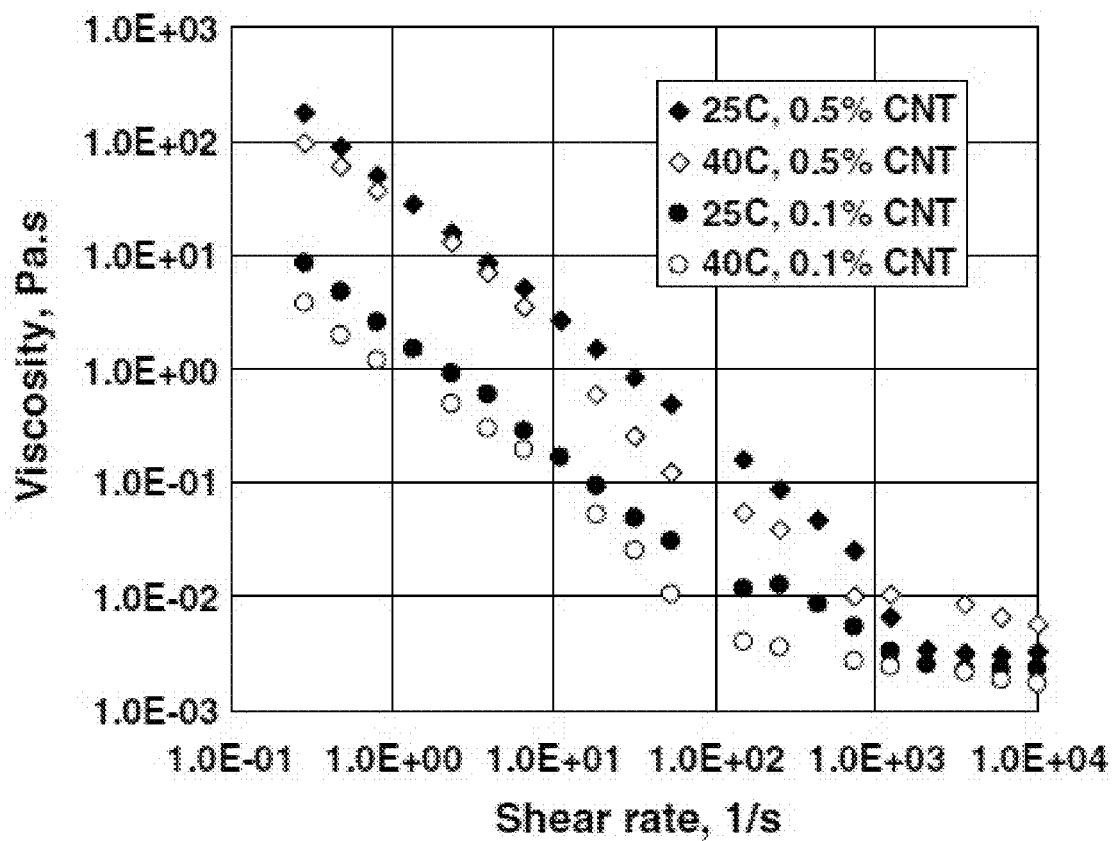
FIG. 8B is similar to FIG. 8A but showing shear rates can differ as a function of temperature or concentration of CNTs.

FIG. 8A depicts the rheological behavior of the MWCNT dispersion used in this study. In a similar manner to previous reports on aqueous nanotube dispersions, [26, 27] the viscosity was observed to decrease significantly with increasing shear rate. This shear thinning behavior is due to the fact that MWCNTs align under shear, which lowers their resistance to flow. The viscosity of the dispersion used in this study plateaus at ~800 $s^{-1}$, indicating that the nanotubes reach their maximum degree of alignment at shear rates above this value. See FIG. 8A—Rheological behavior of the aqueous MWCNT dispersion used in this study. See also FIG. 8B, which includes the data of FIG. 8A but shows how thinning behavior varies as a function of temperature and concentration of the nanostructures in the fluid (pH=6.0).

4.2 Fabrication of Aligned BP

Figure 9D:
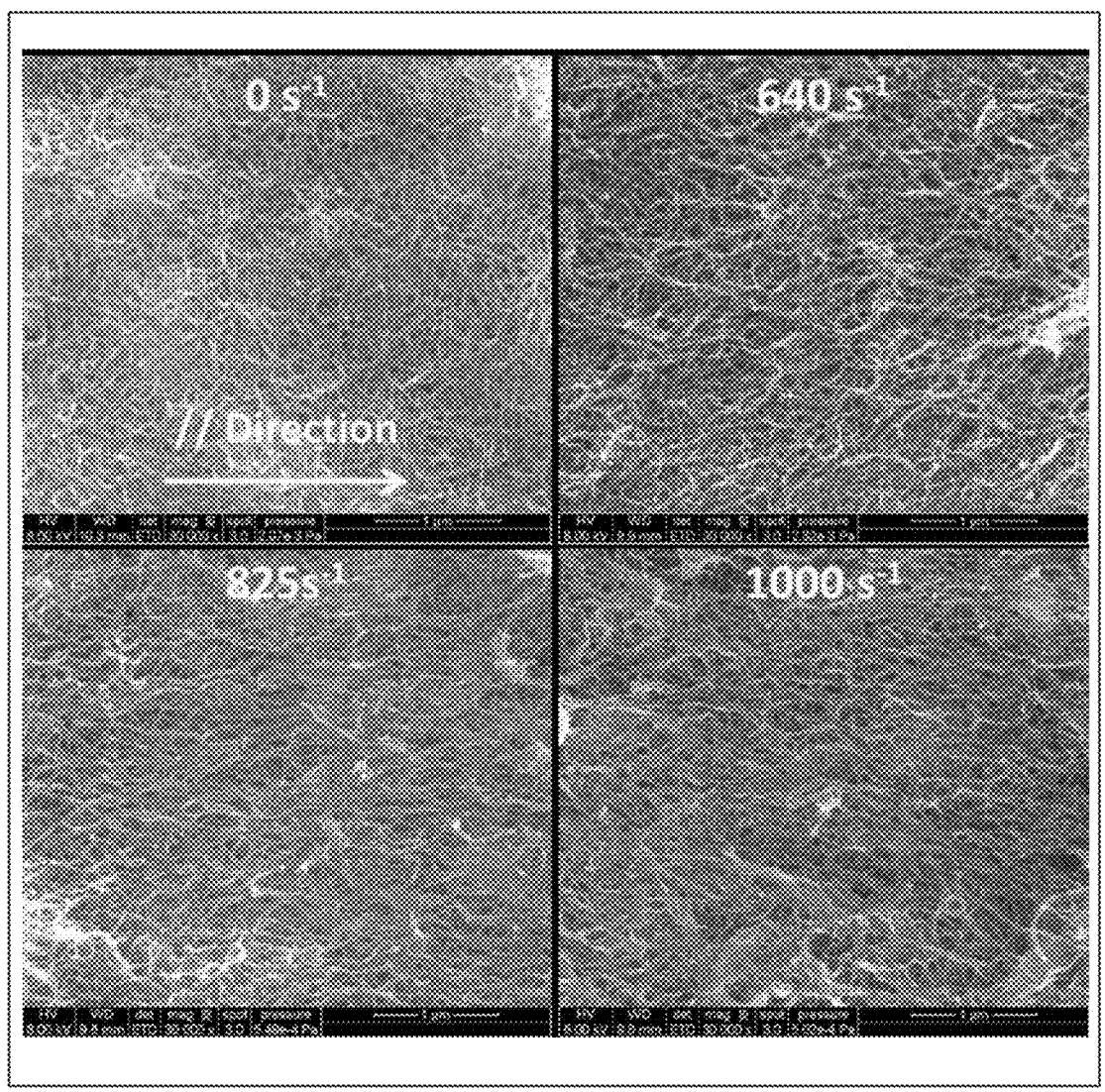
FIG. 9D are plan view microphotographs similar to FIG. 9A but showing back or opposite views.

The Taylor-Couette setup is a classic method for studying fluid behavior under shear. By rotating the outer and/or inner cylinder, shear forces develop in the fluid trapped between the two cylinders, the magnitude of which is determined by both their radii and relative speeds. [28] Rotation of the outer cylinder is desirable for aligning fibers in solution as it avoids turbulent transitions that can occur from instabilities associated with rotation of the inner cylinder. [29] The modified Taylor-Couette setup used in this study was designed to produce shear rates from 0 $s^{-1}$ to 1200 $s^{-1}$. By shearing the dispersion while simultaneously applying a vacuum to the inner cylinder, the suspended nanotubes were circumferentially aligned and then forced onto filter paper. Progressive build-up of MWCNT layers led to the formation of BP comprised of nanotubes with a preferential orientation parallel to the circumference of the cylinders. In this description, the direction of flow is referred to as "//", and the direction perpendicular to flow (the axial cylinder direction) is referred to as "⊥". The morphology of samples produced at various shear rates is depicted in FIG. 9A, in which all of the micrographs were collected from the front side of the MP (side adjacent to cylinder gap). With no cylinder rotation (0 $s^{-1}$), the nanotubes are randomly oriented. As the shear rate is increased to 640 $s^{-1}$, the nanotubes become partially oriented in the // direction. At an even higher shear rate of 825 $s^{-1}$, the MWCNTs are highly aligned in the direction of flow. Shear rates above 825 $s^{-1}$ also produced BP with MWCNTs oriented in the // direction, although a higher degree alignment is not discernible. Notably, the degree of alignment appears to vary somewhat through the thickness of the BP film. FIG. 9D shows representative micrographs of BP produced at different shear rates as viewed from the backside of the films (side adjacent to filter paper). The degree of nanotube alignment seems diminished compared to the front side, possibly due to interactions among the nanotubes and filter paper fibers. See FIG. 9A—Scanning electron micrographs of BP formed at shear rates of 0 $s^{-1}$, 640 $s^{-1}$, 825 $s^{-1}$, and 1000 $s^{-1}$.

4.3 Electrical Conductivity of BP

While SEM indicates alignment of MWCNTs in BP produced at elevated shear rates, it is a qualitative measure. To better quantify the degree of anisotropy, the electrical conductivity of BP samples was measured in different directions. FIG. 10A shows representative current-voltage curves obtained from four point probe measurements of ~100 μm thick BP produced at shear rates of 0 $s^{-1}$ and 1000 $s^{-1}$. BP formed at all shear rates displays Ohmic behavior. However, random BP fabricated in the absence of shear exhibits very little directional dependence, while BP formed at a shear rate of 1000 $s^{-1}$ has markedly lower slope (V/I) in the // direction and higher slope when measured ⊥ to alignment as a result of higher and lower conductivity, respectively. FIG. 10B illustrates the manner in which the measurements were taken.

Figure 11:
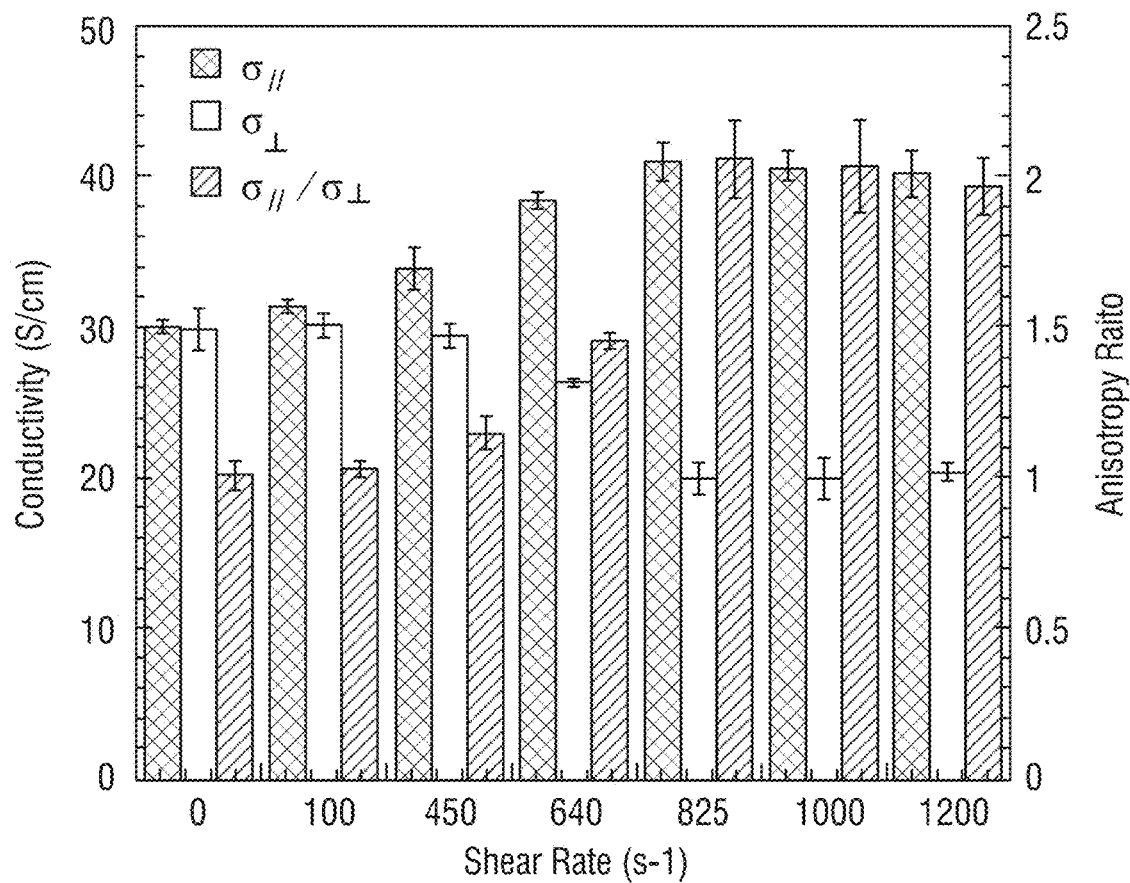
FIG. 11 is a graph illustrating demonstrated anisotropic electric properties of aligned BP under different shear rates produced in a device like FIG. 6A.

FIG. 11 summarizes the electrical behavior of BP produced in this study as a function of shear rate and measurement direction. At low shear rates, the electrical anisotropy, defined as the ratio of conductivity measured // and ⊥ to alignment, is ~1. With increasing shear rate, the conductivity steadily increases // to alignment while decreasing in the ⊥ direction, and the anisotropy ratio reaches a plateau of ~2 around 825 $s^{-1}$. This behavior coincides with a plateau in shear thinning observed by rheology, and suggests that viscosity measurements are a convenient method for determining the minimum shear rate needed to maximize nanotube alignment. See FIGS. 10A-B—Representative I-V curves for BP samples produced in the absence of shear (dashed lines) and at shear rates of +1000 $s^{-1}$ (solid lines) measured both parallel (solid square or circular data points) and perpendicular (open square or circular data points) to the direction of flow. See also FIG. 11—Summary of electrical conductivity measurements performed on BP in directions parallel ($\sigma$//) and perpendicular ($\sigma\perp$) to the direction of flow at various shear rates (an anisotropy ratio of the two ($\sigma$///$\sigma\perp$) is also depicted. That ratio is an indication of the degree of anisotropy of the material. As can be seen, anisotropy is maximized above 825 $s^{-1}$ shear rates. Also $\sigma$///$\sigma\perp$ plateaus at a value of approximately 2.

Conductivity in BP is generally dictated by nanotube-nanotube junctions, which limit the mean free paths of electrons and lower the conductivity. [30, 31] The BP produced in this study does not contain perfectly aligned MWCNTs, and as a result, nanotube-nanotube junctions play a role in the conductivity in all directions. However, electrons traveling in the // direction of aligned BP samples will encounter far fewer junctions than electrons traveling in the transverse direction, and, as a result will experience less resistance. Anisotropic electrical conductivity has been observed in aligned BP samples produced by other methods, and Table 2 (below) compares the results of this study with a select number of those previously reported in the literature. Here we report a maximum anisotropy of ~2, which is lower than that achieved using magnetic alignment and pulling of VACNTs, but similar to the value found by "domino pushing" MWCNT forests.

The lower levels of anisotropy found in this study may be due to the presence of a higher number of misaligned nanotubes than by magnetic alignment. Because the relaxation time of water is very short, the aqueous dispersions used in this study may have allowed some MWCNTs to relax and coil upon removal of shear forces, especially on the upper few layers, which are less constrained by neighboring nanotubes. The use of higher viscosity fluids may limit such relaxation and improve nanotube alignment and packing density. Greater levels of alignment might also be achieved by tuning the interaction among the nanotubes, surfactant, and filter paper, and greater electrical properties could be realized by extending the approach to other varieties of CNTs such as high aspect ratio SWCNTs.

TABLE 2

Literature reports of electrical anisotropy in aligned BP at room temperature

| Method | $\sigma//$ (S/cm) | $\sigma\perp$ (S/cm) | $\sigma///\sigma\perp$ | Reference |
|---|---|---|---|---|
| Magnetic Alignment | | | | |
| SWCNT | 1100 | 138 | 8.0 | [32] |
| SWCNT | 1210 | 200 | 6.1 | [33] |
| Pushing/pulling | | | | |
| VACNT | | | | |
| MWCNT | 209 | 110 | 1.9 | [34] |
| MWCNT | 403 | 56 | 7.2 | [31] |
| Mechanical Stretching | | | | |
| Nanocomp MWCNT* oriented BP | 600 | — | — | [5] |

Figure 12:
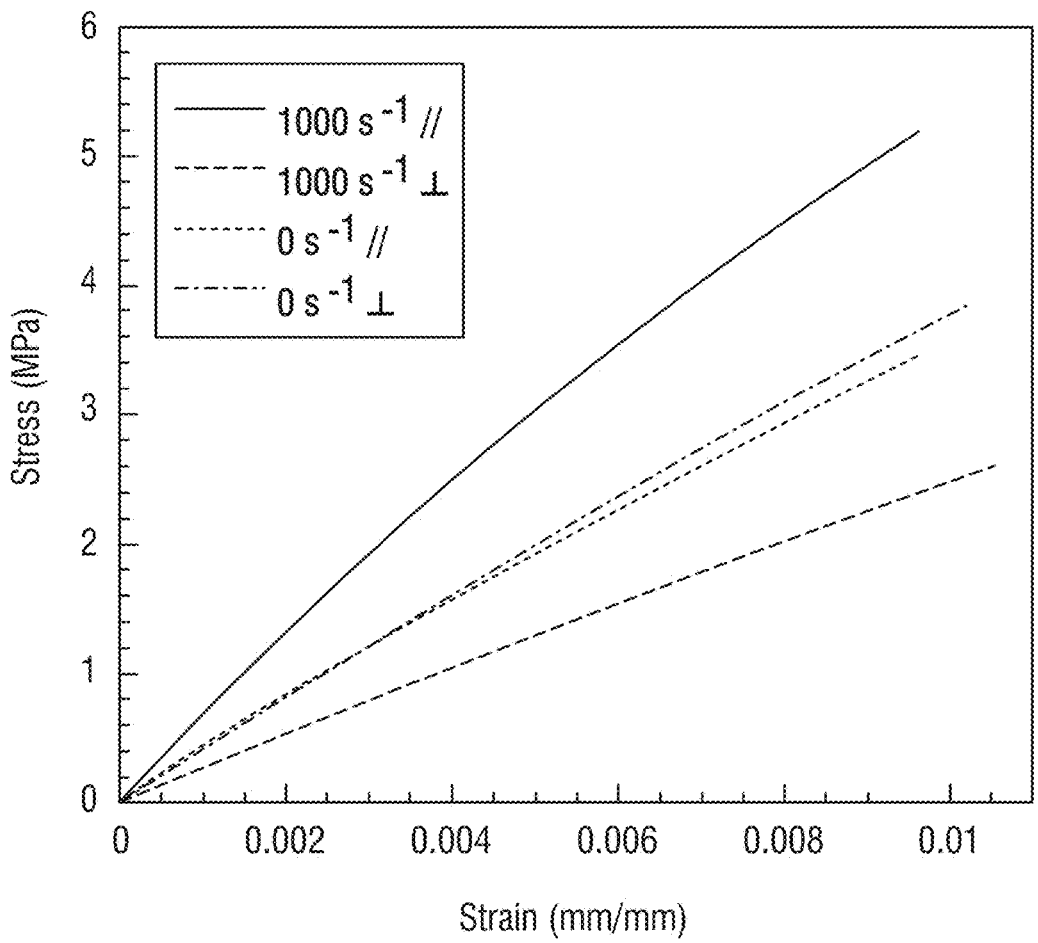
FIG. 12 is a graph demonstrating anisotropic mechanical properties for aligned BP in comparison to non-aligned.

*Study did not report $\sigma\perp$ but did find that $\sigma//$ was 40% higher than randomly oriented BP 4.4 Mechanical Properties of BP The anisotropic mechanical properties of BP produced in the absence of shear and at a shear rate of 1000 s$^{-1}$ were also investigated to test the efficacy of BP for composite applications. FIG. 12 shows representative stress-strain curves for BP tested at both shear rates in different directions. The results of testing many samples are summarized in FIGS. 13A-C. Randomly oriented BP has a modulus of ~0.4 GPa, ultimate tensile strength near 4 MPa, and a strain at break of 1% with no directional dependence within experimental error. In contrast, BP produced under high shear shows strong anisotropy, with moduli and tensile strengths 2.8 and 2.2 times higher in the direction of alignment, respectively. However, even in the direction of alignment, the mechanical properties are modest, and further improvements are likely needed before the BP can be considered for use as reinforcement in composites. See FIG. 12—Representative stress-strain curves for BP produced in the absence of shear (0 s$^{-1}$) and at $\dot{\gamma}$=1000 s$^{-1}$ in directions both parallel and perpendicular to flow. See also FIGS. 13A-C—Summary of mechanical properties for BP prepared in the absence of shear (0 s$^{-1}$) and at 1000 s$^{-1}$ in directions both parallel (//) and perpendicular ($\perp$) to flow.

5 CONCLUSIONS

A simple method for aligning nanotubes in BP with a modified Taylor-Couette system is here reported. Simultaneous shear-alignment and filtration of an aqueous MWCNT dispersion yielded BP with preferential nanotube orientation in the direction of flow. The BP exhibited anisotropic electrical and mechanical properties, which were both enhanced parallel to the direction of orientation and maximized at high shear rates. While the highest degree of anisotropy was found to be lower than some previously reported methods, such as magnetic alignment, the technique presented here is simple and versatile in that it can be adapted for use with any type of CNT synthesized by any method. In addition, large BP sheets can be easily fabricated by increasing the length and diameter of the cylinders in the setup, making this approach an attractive route for the producing large quantities of oriented BP at relatively low cost.

6 REFERENCES (ALL INCORPORATED BY REFERENCE HEREIN)

[1] Moniruzzaman M, Winey K I. Polymer Nanocomposites Containing Carbon Nanotubes. Macromolecules. 2006; 39(16):5194-205.

[2] Fiedler B, Gojny F H, Wichmann M H G, Nolte M C M, Schulte K. Fundamental aspects of nano-reinforced composites. Composites Science and Technology. 2006; 66(16):3115-25.

[3] Wang Z, Liang Z, Wang B, Zhang C, Kramer L. Processing and property investigation of single-walled carbon nanotube (SWNT) buckypaper/epoxy resin matrix nanocomposites. Composites Part A: Applied Science and Manufacturing. 2004; 35(10):1225-32.

[4] Ashrafi B, Guan J, Mirjalili V, Hubert P, Simard B, Johnston A. Correlation between Young's modulus and impregnation quality of epoxy-impregnated SWCNT buckypaper. Composites Part A: Applied Science and Manufacturing. 2010; 41(9):1184-91.

[5] Cheng Q, Bao J, Park J, Liang Z, Zhang C, Wang B. High Mechanical Performance Composite Conductor: Multi-Walled Carbon Nanotube Sheet/Bismaleimide Nanocomposites. Advanced Functional Materials. 2009; 19(20): 3219-25.

[6] Pham G T, Park Y-B, Wang S, Liang Z, Wang B, Zhang C et al. Mechanical and electrical properties of polycarbonate nanotube buckypaper composite sheets. Nanotechnology. 2008; 19(32):325705.

[7] Guo H, Sreekumar T V, Liu T, Minus M, Kumar S. Structure and properties of polyacrylonitrile/single wall carbon nanotube composite films. Polymer. 2005; 46(9): 3001-5.

[8] Gonnet P, Liang Z, Choi E S, Kadambala R S, Zhang C, Brooks J S, et al. Thermal conductivity of magnetically aligned carbon nanotube buckypapers and nanocomposites. Current Applied Physics. 2006; 6(1):119-22.

[9] Jin Gyu P, Jeffrey L, Qunfeng C, Jianwen B, Jesse S, Richard L, et al. Electromagnetic interference shielding properties of carbon nanotube buckypaper composites. Nanotechnology. 2009; 20(41):415702.

[10] Cheng Q, Wang B, Zhang C, Liang Z. Functionalized Carbon-Nanotube Sheet/Bismaleimide Nanocomposites: Mechanical and Electrical Performance Beyond Carbon-Fiber Composites. Small. 2010; 6(6):763-7.

[11] Jiang K, Li Q, Fan S. Spinning continuous carbon nanotube yarns. Nature. 2002; 419(6909):801.

[12] Zhang M, Fang S, Zakhidov A A, Lee S B, Aliev A E, Williams C D, et al. Strong, Transparent, Multifunctional, Carbon Nanotube Sheets. Science. 2005; 309(5738): 1215-9.

[13] Zhang X, Li Q, Holesinger T G, Arendt P N, Huang J, Kirven P D, et al. Ultrastrong, Stiff, and Lightweight Carbon-Nanotube Fibers. Advanced Materials. 2007; 19(23):4198-201.

[14] Zhang M, Atkinson K R, Baughman R H. Multifunctional Carbon Nanotube Yarns by Downsizing an Ancient Technology. Science. 2004; 306(5700):1358-61.

[15] Liu K, Sun Y, Lin X, Zhou R, Wang J, Fan S, et al. Scratch-Resistant, Highly Conductive, and High-Strength Carbon Nanotube-Based Composite Yarns. ACS Nano. 2010; 4(10):5827-34.

[16] Liu K, Sun Y, Zhou R, Zhu H, Wang J, Liu L, et al. Carbon nanotube yarns with high tensile strength made by a twisting and shrinking method. Nanotechnology. 2010; 21(4):045708.

[17] Lima M D, Fang S, Lepró X, Lewis C, Ovalle-Robles R, Carretero-Gonzalez J, et al. Biscrolling Nanotube Sheets and Functional Guests into Yarns. Science. 2011; 331(6013):51-5.

[18] Li W, Jayasinghe C, Shanov V, Schulz M. Spinning Carbon Nanotube Nanothread under a Scanning Electron Microscope. Materials. 2011; 4(9):1519-27.

[19] Liu W, Zhang X, Xu G, Bradford P D, Wang X, Zhao H, et al. Producing superior composites by winding carbon nanotubes onto a mandrel under a poly(vinyl alcohol) spray. Carbon. 2011; 49(14):4786-91.

[20] Ding W, Pengcheng S, Changhong L, Wei W, Shoushan F. Highly oriented carbon nanotube papers made of aligned carbon nanotubes. Nanotechnology. 2008; 19(7): 075609.

[21] Walters D A, Casavant M J, Qin X C, Huffman C B, Boul P J, Ericson L M, et al. In-plane-aligned membranes of carbon nanotubes. Chemical Physics Letters. 2001; 338(1):14-20.

[22] Park J G, Smithyman J, Lin C-Y, Cooke A, Kismarahardja A W, Li S, et al. Effects of surfactants and alignment on the physical properties of single-walled carbon nanotube buckypaper. Journal of Applied Physics. 2009; 106(10):104310-6.

[23] Lu J P. Novel Magnetic Properties of Carbon Nanotubes. Physical Review Letters. 1995; 74(7):1123-6.

[24] Wang L, Davids P S, Saxena A, Bishop A R. Correlation effects and electronic properties of fullerenes and carbon nanotubes. Journal of Physics and Chemistry of Solids. 1993; 54(11):1493-6.

[25] Lin M F, Shung K W K. Magnetization of graphene tubules. Physical Review B. 1995; 52(11):8423-38.

[26] Ding Y, Alias H, Wen D, Williams R A. Heat transfer of aqueous suspensions of carbon nanotubes (CNT nanofluids). International Journal of Heat and Mass Transfer. 2006; 49(1-2):240-50.

[27] Halelfadl S, Estelle P, Aladag B, Doner N, Mare T. Viscosity of carbon nanotubes water-based nanofluids: Influence of concentration and temperature. International Journal of Thermal Sciences. 2013; 71(0):111-7.

[28] Darby R. Chemical Engineering Fluid Mechanics: Marcel Dekker; 2001.

[29] Andereck C D, Liu S S, Swinney H L. Flow regimes in a circular Couette system with independently rotating cylinders. Journal of Fluid Mechanics. 1986; 164:155-83.

[30] Yang D J, Wang S G, Zhang Q, Sellin P J, Chen G. Thermal and electrical transport in multi-walled carbon nanotubes. Physics Letters A. 2004; 329(3):207-13.

[31] Inoue Y, Suzuki Y, Minami Y, Muramatsu J, Shimamura Y, Suzuki K, et al. Anisotropic carbon nanotube papers fabricated from multiwalled carbon nanotube webs. Carbon. 2011; 49(7):2437-43.

[32] Fischer J E, Zhou W, Vavro J, Llaguno M C, Guthy C, Haggenmueller R, et al. Magnetically aligned single wall carbon nanotube films: Preferred orientation and anisotropic transport properties. Journal of Applied Physics. 2003; 93(4):2157-63.

[33] Hone J, Llaguno M C, Nemes N M, Johnson A T, Fischer J E, Walters D A, et al. Electrical and thermal transport properties of magnetically aligned single wall carbon nanotube films. Applied Physics Letters. 2000; 77(5):666-8.

[34] Wang D, Song P, Liu C, Wu W, Fan S. Highly oriented carbon nanotube papers made of aligned carbon nanotubes. Nanotechnology. 2008; 19(7):075609.

D. Options and Alternatives

It is to be appreciated that the invention can take many forms and embodiments and that the exemplary embodiments neither limit nor define the scope of the invention, which is defined by the appended claims. Variations obvious to those skilled in the art are included within the invention.

For example, the generalized and specific examples given above provide illustrations of some of the ways the invention can be implemented. The designer can vary one or more aspects according to need or desire.

For further example, as mentioned, the specific apparatus to influence nanostructure alignment is not necessarily limited to Taylor-Couette devices. And even with Taylor-Couette devices, variations are possible. One variation would be to vacuum-assist filter the dispersion of nanostructures at the outer cylinder (fixed) instead of the inner cylinder (rotating). A porous or fluid permeable section of the outer cylinder could be covered by filter medium to collect the nanostructures. Still further, it may be possible to filter at both the inner and outer cylinders and one or the other, or both, could be rotating. Another variation would be filtering without vacuum-assist. And, as mentioned, the dimensions and operational variables of the Taylor-Couette apparatus such as apparatus 10 can be varied according to need or desire. Longer cylinders, perhaps with a larger gap 28 between, could be configured to produce larger area size BP or the like sheets. The device 10 could also be scaled down from the dimensions indicated to produce a smaller area sheet. The designer can tune or select from the various design parameters to affect such things as density or how tightly packed the aggregated nanostructures are in the free-standing mat or sheet, the degree of preferential alignment of nanostructures, and the size and even shape of the mat or sheet. The designer can select attributes about the system from at least the following general rules but variations from them are possible:

a. Gap width: The gap between inner and outer cylinders is a function of the cylinder radii and the minimum and maximum ratios of the inner cylinder to the outer cylinder can be 0.70 to 0.99. The gap width can vary, but the larger the gap, the lower the shear stress and the faster the cylinders must be spun. Therefore, rotational speed generally governs the gap size chosen. There may be an upper limit to the gap size that must be avoided to prevent turbulence. Indications are that keeping the radii ratio <0.7 should avoid that problem.

b. Radii of cylinders: The minimum and maximum radii of the inner cylinder can be between approximately 1 mm and 2 m.

c. Speed of rotation: The rotational speed of the outer cylinder typically could range from 100-2500 rpm. The range discussed above may or may not work with different radii cylinders and gap sizes. It would be dependent upon the shear rate desired.

d. Resident time. Typical time of operation to extract a buckypaper sheet would be on the order of 60 to 300 seconds. However, greater or less resident time of the dispersion in the gap would result in thicker or thinner BP. The system typically is operated for a sufficient time to build up a sufficient density of nanostructures to form a tightly-packed free-standing layer when removed from the filter paper. The basic rule to decide how long the system should be operated for that purpose depends on, for example, i) the ease with which the BP can be separated from the filter membrane (generally the minimum is 15 µm to allow for easy separation) and (ii) the desired thickness for a given application (longer filtration produces thicker BP. The basic range of density of nanostructures would be on the order of 0.5-1 g/cm$^3$ per. The basic range of thicknesses of the final layer would typically be between 15 and 500 µm. The minimum thickness can be dictated by the mechanical properties of the BP: a minimum of about 15 um is generally indicated for easy separation of the BP from the filter. The maximum thickness is generally a function of filtration time and vacuum power. Longer time and stronger vacuum are indicated to lead to thicker deposition, although the rate of thickness increase will likely decrease as the BP gets thicker due to the fact that it too acts as a filtering medium (increasing the effective filter thickness).

e. Filter characteristics. The range of average pore size is dependent upon the size of the nanostructures and the desired filtration speed. And the offset between the average pore size of the porous section of the inner cylinder and the average pore size of the filter paper is not critical—the inner pore size can be larger but typically should not be significantly smaller than the filter pore size in order to maximize BP formation speed. The pore size of the filter is important. It is indicated that it should have pore size large enough to allow fast fluid flow but small enough to prevent excessive loss of nanostructures through the filter. The filter in one embodiment is unwoven.

f. Amount of vacuum-assist. A range of between 650 and 125 torr is believed sufficient for effective vacuum-assist. However, it may be possible to collect the nanostructures without vacuum-assist.

g. Materials. Basic general rules regarding the material properties of the inner and outer cylinders is that at least the walls containing the dispersion should have an absolute roughness of on the order of 0.0015 to 0.1 mm, a coefficient of friction of on the order of 0.1 to 0.6.

h. Tightly-packed self-standing sheet or mat. By tightly-packed it is meant that the density per square cm of nanostructures ranges from 1 to 1.3 mg/cm$^2$. By self-standing it is meant that the BP is unsupported and can be handled in ways analogous to paper including rolling, folding, etc.

i. Shear rates. The foregoing description gives examples of shear rates deemed effective for an effective amount of preferential alignment of nanostructures. It is to be understood, however, there could be situations where shear rates below those to achieve maximum alignment are desirable. But typically, shear rates of between 500 s$^{-1}$ and 1200 s$^{-1}$ should achieve beneficial preferential alignment in the flowing fluid for most nanostructures of the type discussed herein.

j. Degree of alignment. This can be difficult to quantify so one way is to use anisotropic property measurements to indirectly define extent of alignment. For instance, electrical and mechanical anisotropy measurements (e.g. such as described earlier) give a sense of the degree to which the nanotubes are aligned. One goal for an embodiment of the invention could be a degree of anisotropy in the approximate range of 1 to 2 between directions parallel and perpendicular to an axis of alignment.

What is claimed is:

1. An apparatus for making a mat or sheet of nanostructures each having an elongated axis comprising:
   a. at least one surface with a boundary along a flow path which a dispersion of elongated nanostructures and fluid can flow;
   b. a flow generator controllable to generate a fluid flow effective to promote preferential alignment of the nanostructures in the flow; and
   c. an agglomeration or aggregation component operatively associated with the boundary which isolates the nanostructures into a layer;
   d. so that the layer can be processed into a free-standing mat or sheet.

2. The apparatus of claim 1 wherein the agglomeration or aggregation component comprises a fluid permeable surface between the fluid chamber and the fluid outlet, wherein the boundary comprises a section of the fluid chamber and the flow generator generates fluidic shearing forces at or near the permeable surface when the fluid chamber contains the dispersion.

3. The apparatus of claim 1 wherein the flow generator comprises a modified Taylor-Couette system comprising:
   a. concentric outer and inner tubes forming a fluid chamber therebetween;
   b. at least one of the inner tube and the outer tube operatively connected to an actuator to rotate the outer tube relative to the inner tube at different rotational speeds or directions to generate Taylor-Couette flow imparting shear stress on fluid in the chamber;
   c. at least one of the inner tube and outer tube including the agglomeration or aggregation component;
   d. so that a mat or sheet of the nanostructures can be formed on the agglomeration or aggregation component with a degree of alignment of the elongated axes of the nanostructures.

4. The apparatus of claim 3 wherein only the outer tube rotates.

5. The apparatus of claim 4 wherein the actuator is adapted to rotate the outer tube in the range of approximately 1 rpm to 2000 rpm.

6. The apparatus of claim 4 wherein only the inner tube includes the agglomeration or aggregation component.

7. The apparatus of claim 3 wherein the agglomeration or aggregation component comprises a porous section positioned along the inner tube and a filtering medium positionable over at least an area of the porous section.

8. The apparatus of claim 7 wherein the filtering medium has characteristics to pass the fluid of the dispersion but filter out at least substantially the nanostructures of the dispersion, and the mat or sheet is formed on the filtering medium.

9. The apparatus of claim 7 further comprising:
   a. a fill inlet to the chamber for supply of the dispersion; and
   b. an outlet to capture the remainder of the filtered dispersion after filtering through the filter medium and the porous section.

* * * * *